(12) United States Patent
Janssen et al.

(10) Patent No.: US 12,455,540 B2
(45) Date of Patent: Oct. 28, 2025

(54) METHOD OF CONTROLLING AN AUTOMATION SYSTEM HAVING CONTROL REDUNDANCY, AND AUTOMATION SYSTEM

(71) Applicant: Beckhoff Automation GmbH, Verl (DE)

(72) Inventors: Dirk Janssen, Verl (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 401 days.

(21) Appl. No.: 18/295,571

(22) Filed: Apr. 4, 2023

(65) Prior Publication Data

US 2023/0236551 A1  Jul. 27, 2023

Related U.S. Application Data

(63) Continuation of application No. PCT/EP2021/078059, filed on Oct. 11, 2021.

(30) Foreign Application Priority Data

Oct. 14, 2020 (DE) .......................... 102020127022.4

(51) Int. Cl.
  *G05B 9/03* (2006.01)
  *G05B 19/042* (2006.01)

(52) U.S. Cl.
  CPC ............ *G05B 9/03* (2013.01); *G05B 19/0421* (2013.01); *G05B 2219/24188* (2013.01)

(58) Field of Classification Search
  CPC .................. G05B 9/03; G05B 19/0421; G05B 2219/24188; G05B 19/0428; G05B 2219/14132; G05B 19/058
  See application file for complete search history.

(56) References Cited

U.S. PATENT DOCUMENTS 6,272,386 B1 *  8/2001  McLaughlin ...... G05B 19/4184
                                                        700/82
7,159,152 B2    1/2007  Von
                        (Continued)

FOREIGN PATENT DOCUMENTS

DE  102020127022 A1  4/2022
WO  2022078963 A1    4/2022

OTHER PUBLICATIONS

International Search Report and Written Opinion dated Jan. 5, 2022 in connection with International Patent Application No. PCT/EP2021/078059, 26 pages including English translation.

(Continued)

*Primary Examiner* — Christopher W Carter
(74) *Attorney, Agent, or Firm* — Dorsey & Whitney LLP

(57) ABSTRACT

A method for controlling an automation system having control redundancy is provided. The automation system has at least a first controller, a second controller and a plurality of field devices connected to the first and second controller via a data bus, with the first and second controller configured to cyclically control an automation process of the automation system. The method comprises cyclically controlling the automation process via the first controller, determining a malfunction of the first controller during an (n+x)-th control cycle, where the (n+x)-th control cycle is carried out x control cycles later in time than the n-th control cycle, and sending out an n-th set of output data via a second input-output unit of the second controller to the plurality of field devices in the (n+x)-th control cycle, for controlling the automation process. An automation system is configured to carry out the method.

17 Claims, 8 Drawing Sheets

(56) References Cited

U.S. PATENT DOCUMENTS

| | | | |
|---|---|---|---|
| 2008/0201616 A1* | 8/2008 | Ashmore | G06F 11/0778 |
| | | | 714/57 |
| 2012/0304024 A1 | 11/2012 | Rohleder et al. | |
| 2013/0318041 A1 | 11/2013 | Grosch et al. | |
| 2015/0293779 A1* | 10/2015 | Gamer | G06F 11/2033 |
| | | | 718/108 |
| 2020/0050167 A1* | 2/2020 | Canedo | G05B 19/052 |
| 2020/0136853 A1* | 4/2020 | Schlittenbauer | H04L 12/281 |
| 2022/0147022 A1* | 5/2022 | Yoneda | G06F 11/2028 |

OTHER PUBLICATIONS

International Preliminary Report on Patentability dated Jan. 19, 2023 in connection with International Patent Application No. PCT/EP2021/078059, 52 pages including English translation.

Office Action dated Jul. 23, 2021 in connection with German patent application No. DE 10 2020 127 022.4, 18 pages including English translation.

* cited by examiner

METHOD OF CONTROLLING AN AUTOMATION SYSTEM HAVING CONTROL REDUNDANCY, AND AUTOMATION SYSTEM

CROSS-REFERENCE TO RELATED APPLICATIONS

This patent application is a continuation of International Patent Application No. PCT/EP2021/078059, filed 11 Oct. 2021, METHOD FOR OPERATING AN AUTOMATION SYSTEM WITH CONTROL REDUNDANCY, AND AUTOMATION SYSTEM, which claims the priority of German patent application DE 10 2020 127 022.4, filed 14 Oct. 2020, VERFAHREN ZUM STEUERN EINES AUTOMATISIERUNGSSYSTEMS MIT STEUERUNGS-REDUNDANZ UND AUTOMATISIERUNGSSYSTEM, each of which is incorporated by reference herein, in the entirety and for all purposes.

FIELD

The application provides a method for controlling an automation system having control redundancy. The application further provides an automation system which is set up to execute the method for controlling an automation system having control redundancy.

BACKGROUND

Serial network systems are frequently used in manufacturing and automation technology, in which the decentrally arranged devices of a machine periphery, such as I/O modules, transducers, drives, valves and operator terminals, communicate with automation, engineering or visualization systems. All subscribers are networked with each other via a serial data bus, preferably via a field bus, wherein the data exchange via the data bus is usually carried out on the basis of the active-passive principle in the form of data packets, also referred to as telegrams.

The active units on the data bus, usually the controllers, have bus access authorization and determine the data transfer on the data bus. The passive units on the data bus, usually machine peripherals, do not have bus access authorization, i.e. they may only acknowledge telegrams received or transmit telegrams to an active unit upon request.

The telegrams, also referred to as frames, are composed of control data and user data. The Ethernet standard is often used as the protocol for controlling the data exchange on the data bus, which allows for telegrams having a length of up to 1500 bytes at a simultaneously high transmission speed of up to 10 Gbit/sec.

The data bus of the active-passive automation system often has a ring structure in which the individual passive units on the transmission path are connected to form a ring, with each subscriber connected to two neighbors and the first and last subscriber in the ring connected to the active unit. The telegrams are transmitted in one direction starting from the active unit via its transmitting unit to the first connected passive unit and from there to the next until the last passive unit in the ring in the data transmission direction is reached, and then from the last passive unit back to the receiving unit of the active unit.

A demand to automation systems, especially when used in manufacturing and process automation, is a high fault tolerance, i.e. the capability of the automation system of guaranteeing the required function, i.e. for example the production of a workpiece, despite the occurrence of errors. Errors in the automation system that must be overcome without impairment not only comprise errors in the telegrams but also the failure of a subscriber in the transmission path or an interruption in the transmission path, e.g. in case of the transmission medium being physically cut off.

SUMMARY

A method for controlling an automation system having control redundancy is provided, which allows for safely controlling an automation process of an automation system and allows for compensating a malfunction within the automation system.

Examples

A method for controlling an automation system having control redundancy is provided, wherein the automation system comprises at least a first controller, a second controller and a plurality of field devices connected to the first controller and to the second controller via a data bus, wherein the first controller and the second controller are set up to cyclically control an automation process of the automation system, wherein the first controller comprises:
   a first input-output unit for receiving input data from the field devices and for sending output data to the field devices,
   a first processing unit for executing at least one control task and for analyzing the received input data and generating output data according to the control task, and
   a first output memory unit for storing the generated output data,
wherein the second controller comprises:
   a second input-output unit for receiving input data from the field devices and for sending output data to the field devices,
   a second processing unit for executing the at least one control task and for analyzing the received input data and generating output data according to the control task, and
   a second output memory unit for storing the generated output data,
and wherein the method comprises:
   cyclically controlling the automation process of the automation system via the first controller in a first controlling step, wherein the first controlling step is executed in an n-th control cycle, wherein the n-th control cycle is executed in time after an execution of n−1 control cycles, and wherein n is a natural number$\geq 2$, and wherein the first controlling step comprises:
   receiving an n-th set of input data via the first input-output unit of the first controller in a first input receiving step; and
   sending out an (n−x)-th set of output data via the first input-output unit of the first controller to the field devices in a first output transmitting step, wherein x is a natural number$\geq 1$, wherein the emitted (n−x)-th set of output data is generated based on an (n−x)-th set of input data received in an (n−x)-th control cycle according to the control task, and wherein the (n−x)-th control cycle is executed in time x control cycles ahead of the n-th control cycle;
   transmitting the n-th set of input data from the first controller to the second controller in a first data transmitting step;

processing the n-th set of input data and generating an n-th set of output data via the second processing unit of the second controller in a first processing step;

storing the n-th set of output data in the second output memory unit of the second controller in a first output storing step;

determining a malfunction of the first controller during an (n+x)-th control cycle in a malfunction determining step, wherein the (n+x)-th control cycle is executed in time x control cycles later than the n-th control cycle; and sending out the n-th set of output data via the second input-output unit of the second controller to the plurality of field devices in the (n+x)-th control cycle, and controlling the automation process based on the n-th set of output data in a further output transmitting step.

This achieves the technical advantage that an efficient method for controlling an automation system having control redundancy may be provided. The automation system comprises a first controller and a second controller, each of which is set up to cyclically control an automation process of the automation system. The automation system further comprises a plurality of field devices connected to the first controller and the second controller via a data bus. The field devices may be sensors or actuators of the automation system, via which the automation process to be controlled is executed.

In a first controlling step, the first controller controls the automation process cyclically by evaluating input data of the field devices in successive control cycles by of a control task suitable for controlling the automation process and generating corresponding output data. On the basis of the output data, the field devices may be controlled to execute the automation process.

For the purposes of the application, a control cycle is an input/output cycle and describes a period of time from the receipt of input data by the first controller or by the second controller to the transmission of corresponding output data by the respective controller.

BRIEF DESCRIPTION OF THE DRAWINGS

The invention is described in more detail with reference to the accompanying drawings. The figures show.

DETAILED DESCRIPTION

Figure 1:
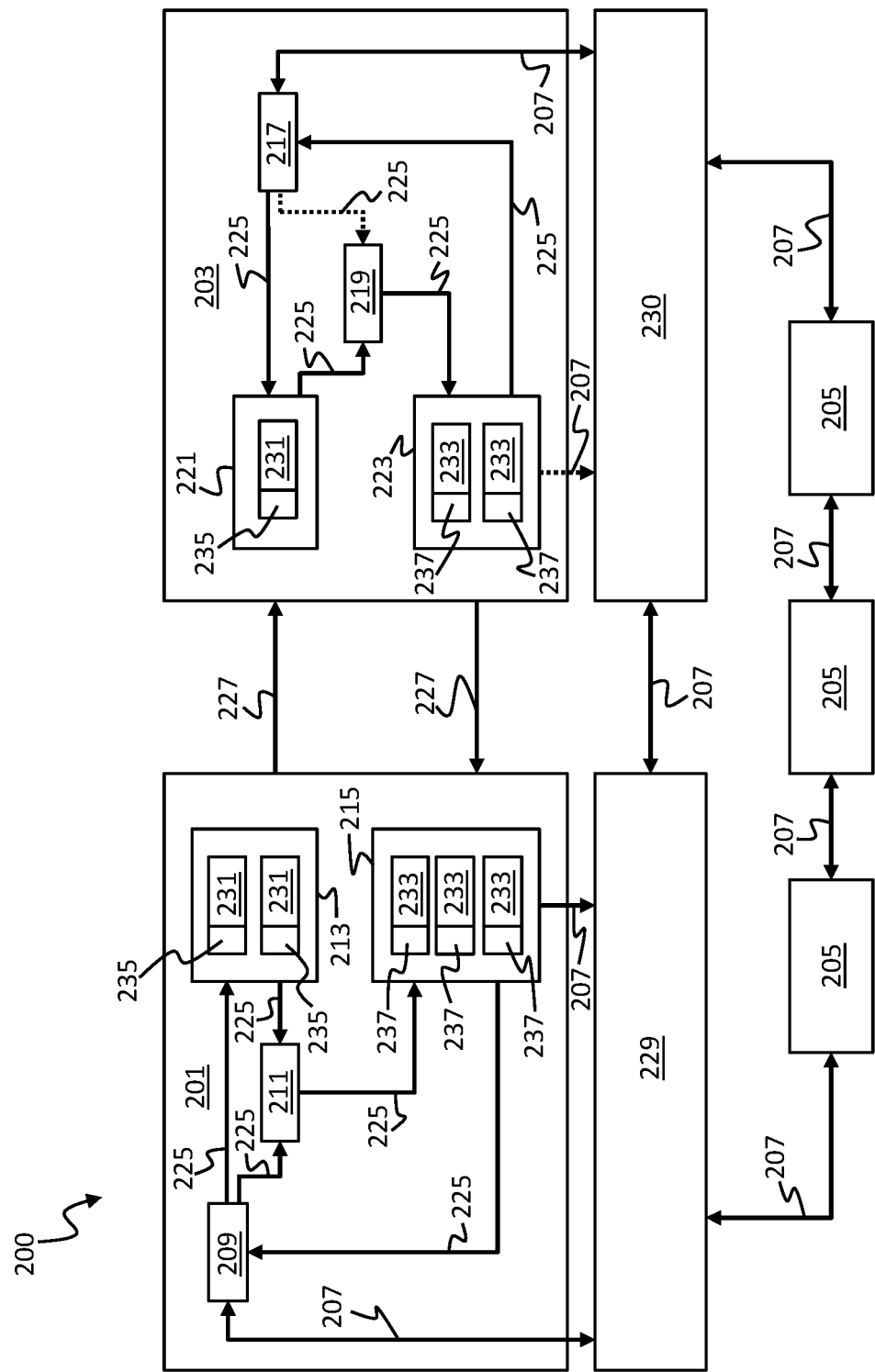
FIG. 1 is a schematic depiction of an automation system according to an embodiment.

For the purposes of the application, input data are in particular sensor data from sensors of the automation system and may e.g. be summarized in a process image of the inputs, as is the rule in the operation of programmable logic controllers (PLCs) and, for the purposes of the application, is part of the control data on the basis of which control of an automation process may be carried out. Output data are, for the purposes of the application, corresponding control data for actuators of the automation system and may likewise be summarized in a process image of the outputs, as usual with PLCs.

For the purposes of the application, a control task is a control program for controlling the automation process. Alternatively, a control task may comprise only a partial program of the control program, so that the entire control program is executed by executing a plurality of control tasks. A control task may comprise a PLC task, where a PLC task is a control program or partial program of a programmable logic controller PLC. Alternatively or additionally, a control task may comprise an NC task, wherein an NC task is a control program or partial program of a numerical control NC.

For executing the control task, each controller comprises a processing unit by which the control tasks or a plurality of control tasks may be executed.

For cyclic control of the automation process, the first controller thus performs a plurality of successive control cycles, in each of which a set of input data e.g. corresponding to a process image of the inputs is received, and a set of output data e.g. corresponding to a process image of the outputs is sent out to the field devices of the automation system.

The method is embodied in such a way that during a control cycle current input data are recorded by the respective controller, which reflect a current state of the automation process to be controlled. In the same control cycle, after receipt of the current input data, output data are sent out to the field devices by the respective controller, which were generated for a control cycle carried out earlier in time according to the control task on the basis of input data recorded earlier in time. In any control cycle, output data are thus sent out to the field devices that were generated on the basis of input data by executing the control task that was received by the respective controller at a temporally earlier control cycle.

Output data are thus sent to the field devices with a time delay relative to the receipt of the respective input data from the corresponding controller. The time delay may comprise any number x of control cycles. For example, output data generated on the basis of input data received at any n-th control cycle may thus be sent out in an (n+x)-th control cycle, the (n+x)-th control cycle being executed x control cycles after the n-th control cycle.

The time delay of sending the output data relative to receiving the corresponding input data may create a dead time that may be used to respond to a malfunction of one of the controllers of the automation system.

For this purpose, input data received from the first controller in any n-th control cycle are transmitted to the second controller. The input data transmitted to the second controller are subsequently analyzed by executing the control task by the second controller and corresponding output data are generated by the second controller. The execution of the control task by the second controller, in particular by a processing unit of the second controller, and the generation of corresponding output data may be performed in the n-th control cycle or in a temporally later control cycle. The generated output data may subsequently be stored in an output memory unit of the second controller.

This achieves that the second controller comprises output data based on the input data received by the first controller in the n-th control cycle. Depending on the preset dead time, which describes the time difference between receiving input data and transmitting output data based on said input data, the output data generated by the second processing unit of the second controller on the basis of the input data received by the first controller at the n-th control cycle may be transmitted to the field devices of the automation system in an (n+x)-th control cycle which is executed later in time than the n-th control cycle by the preset dead time of x control cycles.

For this purpose, the first controller performs an analysis of the input data recorded in the n-th control cycle and generates corresponding output data in a control cycle that is performed in time between the n-th control cycle and an (n+x)-th control cycle.

After further cyclic control of the automation process via the first controller, in which further input data are recorded for each control cycle and output data are sent out which are based on input data recorded for control cycles executed earlier in time, a malfunction of the first controller is determined for an (n+x)-th control cycle.

After determining the malfunction of the first controller, in the (n+x)-th control cycle, the second controller sends the output data generated on the basis of the input data recorded by the first controller in the n-th control cycle out to the field devices of the automation process. This makes it possible to seamlessly continue controlling the automation process despite a malfunction of the first controller, which has controlled the automation process of the automation system cyclically up until the malfunction.

For the purposes of the application, a malfunction of a controller is an operation of the controller that does not meet the requirements for the operation of a controller. This may manifest itself in that the respective controller outputs faulty output data. Alternatively, a malfunction may comprise that the controller receives input data erroneously, respectively exhibits a technical error of a different nature, which is e.g. accompanied by a corresponding error message. A malfunction of a controller may also comprise the complete failure of a controller. A failure of a controller may in this case be caused by a technical error of the controller. Alternatively, a failure of a controller may also be caused deliberately, e.g. by the respective controller being switched off or removed from the automation system for maintenance purposes or in order to replace it with another controller.

By sending out the output data generated on the basis of the input data recorded in the n-th control cycle by the second controller in the (n+x)-th control cycle in which a malfunction of the first controller was detected, the corresponding output data for controlling the automation process are sent out at the scheduled time despite the malfunction of the first controller. This achieves that an interruption of the automation process due to the malfunction of the first controller may be avoided.

In addition, the preset dead time, which ensures that output data are transmitted with a predetermined time delay relative to the corresponding input data, means that if a malfunction is detected in a controller of the automation system, the other controller may immediately take over control of the automation process, since for any given control cycle the second controller already has a plurality of different sets of output data, each of which is to be transmitted either for the respective control cycle or for a control cycle to be executed later in order to control the automation process. Due to the sets of output data already stored, the second controller is thus set up at any time to take over control of the automation process on the relevant output data in each case.

The control redundancy may ensure safe control of the automation system. As the automation process may be continued without delay by the second controller if a malfunction of the first controller is detected, safety requirements for the respective automation system may be fulfilled, achieving an undisturbed sequence of the automation process to be controlled. In this way, an increased degree of safety of the automation system may be achieved.

Additional Examples

According to an embodiment, the method further comprises:
cyclically controlling the automation process of the automation system via the second controller in a second controlling step; wherein the second controlling step is executed in an (n+m+x)-th control cycle, where m is a natural number≥1, wherein the (n+m+x)-th control cycle is executed m control cycles later in time than the (n+x)-th control cycle, and wherein the second controlling step comprises:
receiving an (n+m+x)-th set of input data via the second input-output unit of the second controller in a second input receiving step; and
sending out an (n+m)-th set of output data via the second input-output unit of the second controller to the field devices in a second output transmitting step, wherein the (n+m)-th set of output data sent out is generated based on an (n+m)-th set of input data received in an (n+m)-th control cycle according to the control task, and wherein the (n+m)-th control cycle is performed x control cycles ahead in time of the (n+m+x)-th control cycle.

This achieves the technical advantage that, in the event of a malfunction of a controller, the control of the automation process of the automation system may be taken over smoothly and without delay by the respective other controller. This ensures that the automation process runs without delay. For this purpose, after determining the malfunction of the first controller in the (n+x)-th control cycle and transmitting the respective n-th set of output data by the second controller in the (n+x)-th control cycle, the automation process is controlled cyclically by the second controller in the control cycles following the (n+x)-th control cycle.

For this purpose, the second controller receives a corresponding set of input data for each control cycle and sends out a set of output data to the field devices. For this purpose, the fixed dead time is also taken into account, so that the second controller sends out output data for any control cycle that was generated for a control cycle executed earlier based on input data received earlier.

According to an embodiment, the first controller further comprises a first output memory unit for storing output data, wherein in the n-th control cycle, the (n−x)-th set of output data is stored in the first output memory unit, and wherein the (n−x)-th set of output data is generated in the (n−x)-th control cycle or in any control cycle temporally interposed between the (n−x)-th control cycle and the n-th control cycle.

This achieves the technical advantage that an arbitrary predetermined dead time may be generated, which comprises a time span of a plurality of successive control cycles. By storing the output data in the first output memory unit of the first controller, it is achieved that the generated output data may be sent out at any later time, i.e.: at any later control cycle.

According to an embodiment, the method further comprises:
processing the n-th set of input data and generating an n-th set of output data via the first processing unit of the first controller in a second processing step;
storing the n-th set of output data in the first output memory unit of the first controller in a second output storing step, wherein generating the n-th set of output data via the first processing unit of the first controller, storing the n-th set of output data in the second output memory unit via the second controller, and transmitting the n-th set of input data from the first controller to the second controller is carried out in the n-th control cycle or in arbitrary control cycles arranged in time between the n-th control cycle and the (n+x)-th control cycle;
processing the (n+m)-th set of input data and generating an (n+m)-th set of output data via the second processing unit of the second controller in a third processing step;
storing the (n+m)-th set of output data in the second output memory unit of the second controller in a third output storing step, wherein generating the (n+m)-th set of output data via the second processing unit of the second controller and storing the (n+m)-th set of output data in the second output memory unit of the second controller are carried out in the (n+m)-th control cycle or in any control cycle temporally interposed between the (n+m)-th control cycle and the (n+m+x)-th control cycle;
processing the (n+m+x)-th set of input data and generating an (n+m+x)-th set of output data via the second processing unit of the second controller in a fourth processing step; and
storing the (n+m+x)-th set of output data in the second output memory unit of the second controller in a fourth output storing step, wherein generating the (n+m+x)-th set of output data via the second processing unit of the second controller and storing the (n+m+x)-th set of output data in the second output memory unit of the second controller is carried out in the (n+m+x)-th control cycle or in any control cycle temporally interposed between the (n+m+x)-th control cycle and an (n+m+2x)-th control cycle.

As a result, the technical advantage may be achieved that a most efficient division of different processes carried out by the first controller or the second controller is made possible. This achieves the most efficient method possible for controlling an automation system.

For this purpose, in the n-th control cycle, an n-th set of input data received from the first controller during the n-th control cycle is analyzed by the first processing unit of the first controller, and a corresponding n-th set of output data are generated. This n-th set of output data is stored in the first output memory unit of the first controller. Generating the n-th set of output data or storing the n-th set of output data in the first output memory unit may take place in the n-th control cycle or in any control cycle carried out between the n-th control cycle and the (n+x)-th control cycle. This achieves that generating the n-th set of output data or storing the n-th set of output data may take place at a time when a corresponding computing time of the processor is available.

By postponing the generation or storage of the output data to a suitable point in time, it may be avoided that other processes have to be stopped or delayed due to the execution of the generation or storage of the output data. Furthermore, the required computing capacity may be reduced by the fact that processes do not necessarily have to be executed in a control cycle, but may be shifted to any other time at which a required computing capacity is available.

Analogously, processing an (n+m)-th set of input data received in an (n+m)-th control cycle from the second controller and generating an (n+m)-th set of output data or storing the (n+m)-th set of output data may take place either during the (n+m)-th control cycle or during any control cycle that is carried out in time between the (n+m)-th control cycle and the (n+m+x)-th control cycle. This in turn may save computing capacity by allowing said processes to be performed at times when the respective computing capacity is available.

Analogously, the generation of an (n+m+x)-th set of output data by the second processing unit or the storage of the generated (n+m+x)-th set of output data may be proceeded with, which may also be performed either during the (n+m+x)-th control cycle or else during any control cycle that lies temporally between the (n+m+x)-th and an (n+m+2x)-th control cycle.

According to an embodiment, the method further comprises:
receiving a further n-th set of input data via the second input-output unit of the second controller in the n-th control cycle in a further input receiving step;
comparing the n-th set of input data of the first controller with the further n-th set of input data of the second controller in a comparing step;
determining a deviation between the n-th set of input data of the first controller and the further n-th set of input data of the second controller in a deviation determining step; and
determining an error in a data transmission between the field devices and the first controller in a transmission error determining step.

This may have the technical advantage of ensuring that the first controller and the second controller operate based on identical input data. This achieves error-free control of the automation process. For this purpose, an n-th set of input data are recorded by the second input/output unit of the second controller in the n-th control cycle and the input data of the n-th set recorded by the second controller are compared to the input data of the n-th set recorded by the first controller. If a discrepancy is detected between the n-th set of input data of the first controller and the n-th set of input data of the second controller, an error in a data transmission between the field devices and the first controller is detected. This error may be interpreted as a malfunction of the first controller, so that when the error in the data transmission between the field devices and the first controller is detected, the second controller takes control of the automation process. This may be used to ensure that the first controller and the second controller operate on identical input data, or that a deviation of the input data received by one controller from the input data received by the other controller determines a malfunction.

According to an embodiment, a plurality of sets of output data are stored in the first output memory unit of the first controller and/or in the second output memory unit of the second controller during the n-th control cycle, wherein the stored sets of output data are in each case generated based on a set of input data received in a control cycle according to the control task, and wherein the respective control cycles are executed in time between the (n−x)-th control cycle and the n-th control cycle, and wherein the respective sets of output data are sent out to the field devices from the first input-output unit of the first controller in respective control cycles executed in time between the n-th control cycle and the (n+x)-th control cycle.

This may achieve the technical advantage that, in the event of a malfunction of a controller, the other controller of the automation system may take over control of the automation process without delay. An interruption of the automation process may thus be avoided. By storing a plurality of sets of output data in the first output memory unit of the first controller and/or in the second output memory unit of the second controller for any given control cycle, each of which is generated on the basis of input data that has been received in an earlier control cycle and is transmitted according to the fixed dead time for a control cycle later in time, the respective other controller may immediately transmit a corresponding set of output data for controlling the automation process to the field devices in the event of a detected malfunction of one of the controllers.

This avoids the situation in which, in order to continue the automation process when a malfunction of one of the controllers is detected, the respective other controller must first generate corresponding output data, which may delay or interrupt the automation process. Since the required sets of output data are already stored in the output memory units of the controllers at any time, the corresponding required output data may be accessed by each controller at any control cycle and sent out to control the automation process.

According to an embodiment, a plurality of sets of output data are stored in the second output memory unit of the second controller during the (n+m+x)-th control cycle, wherein the stored sets of output data were each generated based on a set of input data received in a control cycle according to the control task, and wherein the respective control cycles are executed in time between the (n+m)-th control cycle and the (n+m+x)-th control cycle, and wherein the respective sets of output data are sent out to the field devices from the second input-output unit of the second controller in respective control cycles executed in time between the (n+m+x)-th control cycle and an (n+m+2x)-th control cycle.

This may achieve the technical advantage that for any control cycle after a malfunction of the first controller has been determined, the dead time between receiving input data and sending corresponding output data via the second controller may be maintained. For this purpose, a plurality of sets of output data are stored in the second output memory unit of the second controller at any control cycle after the malfunction of the first controller has been determined, the respective output data being based on input data received at a temporally earlier control cycle. Due to the plurality of sets of output data stored in the output memory unit, a corresponding set of output data may be sent out to the respective field devices in each control cycle so that control of the automation process by the second controller may continue. This may ensure error-free operation of the automation system.

According to an embodiment, the first controller comprises a first input memory unit for storing input data, wherein the second controller comprises a second input memory unit for storing input data, and wherein the method further comprises:
  storing the n-th set of input data in the first input memory unit of the first controller in the n-th control cycle in a first input storing step; and/or
  storing the n-th set of input data transmitted from the first controller to the second controller in the second input memory unit of the second controller in the n-th control cycle in a second input storing step.

This may achieve the technical advantage that the generation of output data may be carried out by executing the control task on corresponding input data at any time. For this purpose, the first controller comprises a first input memory unit and the second controller comprises a second input memory unit, in each of which input data may be stored. When the input data are received in any n-th control cycle, the received input data may thus be stored in the respective input memory unit, so that an analysis of the input data by executing the corresponding control task and a generation of corresponding output data may be postponed to any time, so that an analysis of the received input data does not necessarily have to be performed during the n-th control cycle.

This may save computing capacity by postponing the process to a convenient point in time when the appropriate computing capacity is available. Thus, if multiple processes need to be carried out during a control cycle, the generation of output data may be postponed to a later control cycle. Alternatively, the analysis of the received input data and the generation of corresponding output data may also be carried out between different control cycles or in a time period comprising several control cycles. This provides increased flexibility and efficiency of the method for controlling the automation system.

According to an embodiment, the first controller comprises a first memory area for storing first control data of the first controller, wherein the second controller has a second memory area for storing second control data of the second controller, wherein the first memory area comprises the first input memory unit and the first output memory unit, and wherein the second memory area comprises the second input memory unit and the second output memory unit, further comprising:
  generating a memory copy in a memory copying step, wherein the memory copy is a copy of the first memory area of the first controller and comprising the sets of input data stored in the first input memory unit and the sets of output data stored in the first output memory unit, wherein the memory copy is generated in any control cycle performed temporally before the n-th control cycle and comprising at least one set of input data stored in the first input memory unit at the time of the respective control cycle and/or at least one set of output data stored in the first output memory unit at the time of the respective control cycle;
  transmitting the memory copy to the second controller in a copy transmitting step;
  storing the at least one set of input data of the memory copy in the second input memory unit of the second controller in a first copy storing step; and/or
  storing the at least one set of output data of the memory copy in the second output memory unit of the second controller in a second copy storing step;
  processing the at least one set of input data of the memory copy and generating a corresponding set of output data via the second processing unit of the second controller in a fifth processing step; and
  storing the generated set of output data in the second output memory unit of the second controller in a fifth output storing step.

This may achieve the technical advantage of ensuring that the first controller and the second controller act upon identical input and output data. In particular, when starting up or starting the automation process, it may be achieved by creating a memory copy comprising the control data of the first controller and by transmitting the memory copy to the second controller that the second controller may be operated based on the control data of the first controller. The control data stored in the memory copy may comprise input data and output data of the first controller that have been recorded or generated in control cycles executed earlier.

The first controller and the second controller in this context may be embodied as separate modules, each comprising separate independent memory areas. For example, the first controller and the second controller may each be embodied as individual controllers.

A first memory area of the first controller may in this context comprise the first input memory unit and the first output memory unit. The control data of the first controller may here comprise the sets of input data stored in the first input memory unit or the sets of output data stored in the first output memory unit. Thus, by creating the memory copy and transmitting the memory copy to the second controller, the input data or output data stored in the memory copy may be stored in the corresponding input memory unit or output memory unit of the second controller. On the basis of the output data stored in the output memory unit, the automation process may thus be controlled by the second controller in the event of a malfunction of the first controller. Alternatively, based on the sets of input data transmitted to the second controller with the memory copy, corresponding sets of output data may be generated by executing the control task. On the basis of the generated output data, the second controller may control the automation process if a malfunction of the first controller is detected. Thus, by creating the memory copy and transmitting the memory copy to the second controller, it may be achieved that at any time the first controller and the second controller are executed on identical input data, so that error-free control of the automation process may be achieved by either the first controller or the second controller.

The memory copy may further comprise a program state of the control program or the automation system, respectively, by which a current state of the controlled automation process is described. The program state may store any information required for the operation of the automation process. This information may comprise current values of individual components of the automation process to be controlled, such as measured values describing an operating state of a machine to be controlled. Transferring the memory copy to the second controller achieves that the automation process may be controlled by the second controller on the same state as before by the first controller. Thus, only an immediate transition of the control by the first controller to the control of the automation process by the second controller may be achieved, wherein the control of the automation process may be continued without interruption on the current state by the second controller.

According to an embodiment, the first controller comprises a first communication interface for receiving and transmitting communication data, wherein the second controller comprises a second communication interface for receiving and transmitting communication data, further comprising:
  receiving n-th communication data via the first communication unit of the first controller in the n-th control cycle in a first message receiving step;
  determining n-th response data to the received n-th communication data in a first response generating step;
  storing the n-th response data in the first output memory unit of the first controller in a first response storing step, wherein the n-th response data are stored in the first output memory unit with the n-th set of output data;
  sending out the n-th response data via the first communication interface of the first controller in the (n+x)-th control cycle in a first response transmitting step; and/or
  receiving (n+m+x)-th communication data via the second communication unit of the second controller in the (n+m+x)-th control cycle in a second message receiving step;
  determining (n+m+x)-th response data to the received (n+m+x)-th communication data in a second response generating step;
  storing the (n+m+x)-th response data in the second output memory unit of the second controller in a second response storing step, the (n+m+x)-th communication data being stored in the second output memory unit with the (n+m+x)-th set of output data; and
  sending out the (n+m+x)-th response data via the second communication interface of the second controller in the (n+m+2x)-th control cycle in a second response transmitting step.

This achieves the technical advantage that communication data may be exchanged in addition to control data, enabling communication between the controllers or between modules of the automation system. This allows for efficiently controlling the automation system.

For the purposes of the application, communication data are data of a data communication between components of the automation system and a controller of the automation system. Components may e.g. comprise an HMI human-machine interface or another input unit by which a user is able to access the controller of the automation system.

An automation system comprising at least a first controller and a second controller and a plurality of field devices connected to the first controller and the second controller via a data bus is provided, wherein the first controller and the second controller are set up to cyclically control an automation process of the automation system, the first controller comprising:
  a first input-output unit for receiving input data from the field devices and for sending output data to the field devices,
  a first processing unit for executing at least one control task and for analyzing the received input data and for generating output data according to the control task,
  a first input memory unit for storing the received input data, and
  a first output memory unit for storing the generated output data,
  wherein the second controller comprises:
  a second input-output unit for receiving input data from the field devices and for sending output data to the field devices,
  a second processing unit for executing the at least one control task and for analyzing the received input data and for generating output data according to the control task,
  a second input memory unit for storing input data, and
  a second output memory unit for storing the generated output data, and wherein the automation system is embodied to execute the method according to the application.

This may achieve the technical advantage that an automation system may be provided which is set up to execute the method according to the application for controlling an automation system having control redundancy having the advantages mentioned above.

According to an embodiment, the first controller comprises a first memory area for storing first control data of the first controller, wherein the second controller has a second memory area for storing second control data of the second controller, wherein the first memory area comprises the first input memory unit and the first output memory unit, and wherein the second memory area comprises the second input memory unit and the second output memory unit.

This may achieve the technical advantage that the first memory area of the first controller and the second memory area of the second controller may store the control data of the controllers separately from one another, so that the first controller and the second controller may be operated as separate units. The first controller and the second controller may in particular be embodied as individual controllers. This makes it possible to operate the first controller and the second controller independently of one another, so that if one controller malfunctions, the other controller can take over control of the automation process without being affected. In this way, redundant control of the automation system may be achieved. A malfunction of one controller thus has no influence on the functionality of the other controller.

According to an embodiment, the first controller and the second controller are connected to each other via a data connection and are set up to carry out a data exchange via data communication.

This may achieve the technical advantage that a data communication between the first controller and the second controller is enabled. Via the data link, data exchange may be provided between the first controller and the second controller. As a result, a synchronization of the first controller and the second controller may be achieved, which is required for a control redundancy. The synchronization of the first controller and the second controller ensures that, in the event of a malfunction of one controller, the other controller is able to continue control of the automation process without interrupting the automation process. This ensures efficient control of the automation system.

According to an embodiment, the automation system further comprises a first connecting unit and a second connecting unit, wherein the first connecting unit and the second connecting unit are connected to the field devices and the first controller and the second controller via the data bus, and wherein the first connecting unit and the second connecting unit are set up to control a data flow of input data from field devices to the first controller and to the second controller and/or a data flow of output data from the first controller and/or from the second controller to the field devices.

This may achieve the technical advantage that the data signals exchanged between the controllers and the field devices of the automation system for controlling the automation process arrive at the respective addressed receiver. In particular, when a malfunction of one of the controllers is detected and the control of the automation process is taken over by the respective other controller, the data signals sent out by the field devices may be transmitted to the respective controller that has taken over the control of the automation process via the first connecting unit or the second connecting unit. In this way, smooth control of the automation process by the first controller and the second controller may be achieved by transmitting corresponding output data to the corresponding controller or the field devices via the first connecting unit or the second connecting unit.

According to an embodiment, the first controller comprises a further first processing unit for executing at least one further control task and for analyzing the received input data and for generating further output data according to the further control task, wherein the second controller comprises a further second processing unit for executing the at least one further control task and for analyzing the received input data and for generating output data according to the further control task, and wherein the control task may be executed simultaneously by the first processing unit and the further control task by the further first processing unit of the first controller and/or the control task may be executed simultaneously by the second processing unit and the further control task by the further second processing unit of the second controller.

This may achieve the technical advantage that a multi-tasking function of the automation system may be provided. Via the first controller comprising a further first processing unit and the second controller comprising a further second processing unit, which are each set up to execute a further control task, it may be achieved that a plurality of control tasks may be executed by the respective controller, if necessary simultaneously. This may ensure efficient control of the automation process, in which simultaneous execution of a plurality of control tasks allows for correspondingly accelerated processing of the recorded input data. This enables accelerated processing of the control program within a control cycle or a plurality of control cycles. This ensures processing of a larger volume of input data within a control cycle, allowing for accelerated and thus more efficient control of the automation process. Different control tasks may be executed on different processor cores so that the different control tasks may be processed simultaneously. This reduces the processing time of the control program, which means that a higher volume of data may be processed per control cycle.

According to an embodiment, the first input memory unit and the first output memory unit of the first controller and the second input memory unit and the second output memory unit of the second controller are first-in-first-out memories.

This may achieve the technical advantage that the simplest possible embodiment of the input memory units and the output memory units of the first and second controller may be provided. By embodying the input memory units and the output memory units as first-in-first-out memories, the simplest possible handling of the memory units is made possible, in which input data or output data may easily be stored at earlier times, which may be processed further in a later control cycle. By the respective sequence of the individual sets of input data or output data, in which these are stored in the respective memory unit, the processing of the individual sets of input data and output data may be regulated to the respectively correct control cycle, so that each set of input data or output data may be processed in the respectively intended control cycle. This may ensure seamless control of the automation process.

FIG. 1 shows a schematic depiction of an automation system 200 according to an embodiment.

In the embodiment shown in FIG. 1, the automation system 200 comprises a first controller 201, a second controller 203 and a plurality of field devices 205. The field devices 205 may be embodied as sensors or actuators of the automation system 200. The field devices 205 are connected to the first controller 201 and the second controller 203 via a data bus 207. Furthermore, the automation system 200 comprises a first connecting unit 229 and a second connecting unit 230, which are connected to the first controller 201 and the second controller 203 and to the field devices 205 via the data bus 207. Furthermore, the first and second connecting units 229, 230 are connected to each other via the data bus 207.

The first controller 201 comprises a first input-output unit 209 for receiving input data and for sending output data from and to the field devices 205. Furthermore, the first controller 201 comprises a first processing unit 211 for executing a control task and for analyzing received input data and for generating corresponding output data. Furthermore, the first controller 201 comprises a first input memory unit 213 for storing input data 231.

In the embodiment shown in FIG. 1, the first input memory unit 213 stores two sets of input data 231 and further stores two sets of communication data 235. The number of input data 231 or communication data 235 stored in the first input memory unit 213 is merely exemplary and may differ arbitrarily from the number shown in FIG. 1, so that a plurality of input data 231 or communication data 235 may be stored in the first input memory unit 213.

In addition, the first controller 201 comprises a first output memory unit 215 for storing corresponding output data 233 generated by the first processing unit 211. In FIG. 1, the first output memory unit 215 further stores response data 237.

Communication data 235 and response data 237 are, in the sense of the application, data of a data communication between modules of the automation system 200, e.g. between the first controller 201 and the second controller 203, respectively, and an HMI human-machine interface. Communication data 235 comprise requests to perform certain services or to provide corresponding information, while response data 237 comprise response messages relating to the respective communication data 235 received. Communication data 235 and response data 237 may be received and/or transmitted by the first controller 201 and the second controller 203, respectively, via a corresponding communication interface.

The first input-output unit 209, the first processing unit 211, the first input memory unit 213, and the first output memory unit 215 are interconnected within the first controller 201 via an internal data interface 225. The internal data interface 225 allows for data transfer between the individual units within the first controller 201.

Similarly, the second controller 203 comprises a second input-output unit 217 for receiving input data 231 from the field devices 205 and sending corresponding output data 233 to the field devices 205. Furthermore, the second controller 203 comprises a second processing unit 219 for analyzing the received input data 231 and generating corresponding output data 233 by executing a corresponding control task. Furthermore, the second controller 203 comprises a second input memory unit 221 for storing input data 231 or communication data 235. Furthermore, the second controller 203 comprises a second output memory unit 223 for storing output data 233 or response data 237. Within the second controller 203, the individual units are interconnected via an internal data interface 225 that enables data transmission within the second controller 203.

In addition, the first controller 201 and the second controller 203 are interconnected via a data link 227 that allows for transmitting data between the first controller 201 and the second controller 203.

The first controller 201 and the second controller 203 are each set up to cyclically control an automation process of the automation system 200. Cyclic control of the automation process by one of the controllers comprises receiving corresponding input data 231 from the field devices 205 and sending output data 233 to the respective field devices 205 within a control cycle. For cyclic control of the automation process, a plurality of different control cycles are thus executed one after the other, so that input data 231 of the field devices 205 are received by the first controller 201 and the second controller 203, respectively, and output data 233 are transmitted by the first controller 201 and the second controller 203, respectively, to the field devices 205 for controlling the automation process in cyclic sequence.

To control the automation process, the first controller 201 is set up to receive input data 231 from the field devices 205 via the first input-output unit 209. The received input data 231 may in this context be combined to form a process image of the inputs, as is usual for a programmable logic controller PLC. The received input data 231 may be forwarded to the first processing unit 211 via the internal data interface 225. The first processing unit 211 may execute a control task to analyze the received input data 231 and generate corresponding output data 233. In this regard, the control task may comprise a control program of the automation process.

Alternatively, a control task may comprise a partial program of a control program, such that a plurality of control tasks must be executed in sequence to carry out the overall control program. The generated output data 233 may subsequently be transmitted to and stored in the first output memory unit 215 via the internal data interface 225. The output data 233 may be combined into a process image of the outputs, as is customary for PLCs. At a later time, the output data 233 stored in the first output memory unit 215 may be transmitted to the first input-output unit 209 via the internal data interface 225 and transmitted from the first input-output unit 209 via the data bus 207 to the first interconnecting unit 229 and from there to the field devices 205.

Alternatively, the input data 231 received by the first input-output unit 209 may be transmitted to and stored in the first input memory unit 213 via the internal data interface 225. At a later time, the input data 231 stored in the first input memory unit 213 may be transmitted to the second controller 203 via the data link 227.

The second controller 203 is further set up to store the input data 231 transmitted from the first controller 201 in the second input memory unit 221. The second controller 203 is further configured to transmit the input data 231 stored in the second input memory unit 221 to the second processing unit 219 via the internal data interface 225. The second processing unit 219 may analyze the transmitted input data 231 may be analyzed by executing the control task analogously to the first processing unit 211 and generating corresponding output data 233. These may be transmitted to and stored in the second output memory unit 223 via the internal data interface 225. Furthermore, the second controller 203 is embodied to receive input data 231 from the field devices 205 via the second input-output unit 217. These received input data 231 may also be transmitted to and stored in the second input memory unit 221 via the internal data interface 225. Alternatively, the received input data 231 may be transmitted to the second processing unit 219, analyzed therein, and corresponding output data 233 may be generated, which may be stored in the second output memory unit 223.

In this context, the first controller 201 and the second controller 203 are embodied in such a way that a plurality of output data 233 are stored in the first output memory unit 215 and the second output memory unit 223, respectively, at any time during the execution of the automation process. For controlling the automation process according to the application, it is provided that the first controller 201 or the second controller 203 transmit output data 233, which are stored in the first output memory unit 215 or the second output memory unit 223, to the field devices 205 within a control cycle, wherein the output data 233 transmitted in a control cycle were generated at an earlier time on the basis of received input data 231.

Thus, a dead time is generated, which may comprise a period of a plurality of successive control cycles and describes a delay that occurs between receiving input data 231 and sending out corresponding output data 233 generated by executing the control task based on the received input data 231. Via the plurality of output data 233 stored in the output memory unit 215 or the second output memory unit 223, it is achieved that in any given control cycle, the first controller 201 or the second controller 203, respectively, has a plurality of output data 233 to be sent out to the field devices 205 in a control cycle to be executed at a later time for controlling the automation process.

Thus, if a malfunction of one of the controllers is detected, the respective other controller is able to immediately send out output data 233 in the respective designated control cycle at any time without having to first generate the respective output data 233 designated to be sent out in the respective control cycle.

For example, if a malfunction of the first controller 201 is detected, the second controller 203 is set up to transmit the output data 233 stored in the second output memory unit 223 to the second input-output unit 217 via the internal data interface 225 and to transmit this output data 233 to the field devices 205 via the data bus 207 and the second connecting unit 230 to control the automation process. As long as no malfunction of the first controller 201 occurs, the automation process is controlled by the first controller 201. The second controller 203 is operated in parallel as a redundancy and is maintained in line with the method 100 at the status or in the state of the first controller 201 and is thus able to take over the control of the automation process in place of the first controller 201 at any time.

According to an embodiment, the first controller 201 and the second controller 203 are identical in construction and may be interchanged as desired, so that both the first controller 201 and the second controller 203 may perform control of the automation system 200 in an equivalent manner.

Similarly, the first controller 201 and the second controller 203 are set up to receive communication data 235 via a corresponding communication interface and to transmit it to and store it in the first input memory unit 213 and the second input memory unit 221, respectively, via the internal data interface 225. By executing the control task or, as the case may be, another control task via the first processing unit 211 or the second processing unit 219, corresponding response data 237 may be generated, which may be stored in the first output memory unit 215 or the second output memory unit 223. Via the data connection 227 or the data bus 207, these may be sent out to further modules of the automation system 200, e.g. to the respective other controller, for data communication.

According to an embodiment, the first input memory unit 213, the second input memory unit 221, the first output memory unit 215, and the second output memory unit 223 are first-in-first-out memories. According to an embodiment, the first controller 201 and the second controller 203 each comprise a plurality of first processing units 211 and second processing units 219, respectively, in which a plurality of control tasks may be executed. For example, the individual control tasks may be executed on different processor cores so that simultaneous execution of a plurality of control tasks is possible.

The first connecting unit 229 and the second connecting unit 230 may be configured to forward data signals between the first controller 201, the second controller 203, and the field devices 205 to the addressed receivers, respectively. In particular, the first connecting unit 229 and the second connecting unit 230 may be configured to transmit the data signals emitted by the field devices 205 to the respective other controller in the event of a malfunction of one of the controllers. The first connecting unit 229 and the second connecting unit 230 may thus be used to control data communication between the controllers and the field devices 205 of the automation system 200. The first connecting unit 229 and the second connecting unit 230 may e.g. be embodied as correspondingly configured switches.

According to an embodiment, the automation system 200 may comprise any number of controllers. The controllers of the automation system 200 may each be embodied identically so that, according to the embodiment described above, all controllers may be set up to control the automation process cyclically and, in the event of a malfunction of one of the controllers, to take over control of the automation process seamlessly and without delaying the automation process.

According to an embodiment, the first controller 201 and the second controller 203 each comprise a first memory area and a second memory area, which are separated from each other and in which the input data 231 received from the first controller 201 and generated output data 233, and the input data 231 received from the second controller 203 and generated output data 233, respectively, may be stored. Via the separated memory areas, individualization of the controllers is ensured, which allows for independently operating the individual controllers.

Figure 2:
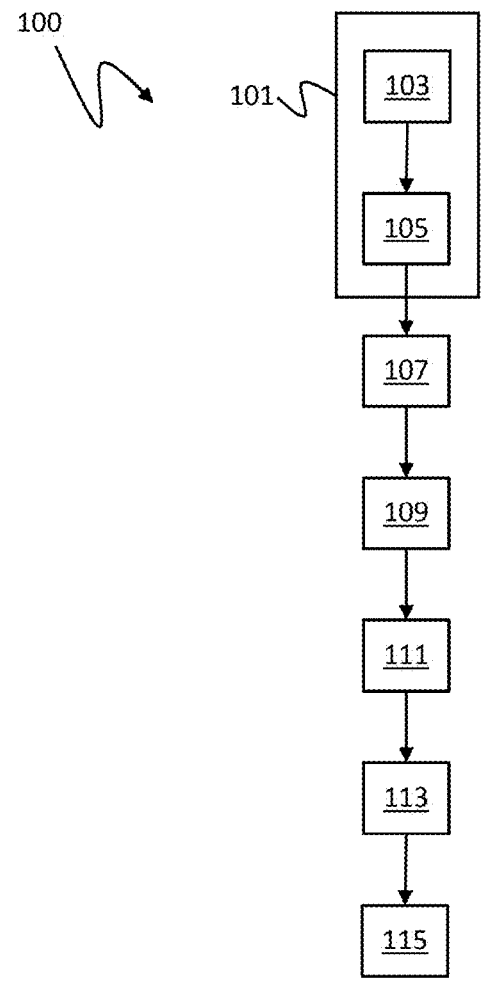
FIG. 2 is a flowchart of a method for controlling an automation system according to an embodiment.

FIG. 2 shows a flowchart of a method 100 for controlling an automation system 200 according to an embodiment.

The method 100 for controlling an automation system 200 with control redundancy is applicable to an automation system 200 according to the embodiment shown in FIG. 1.

Figure 3:
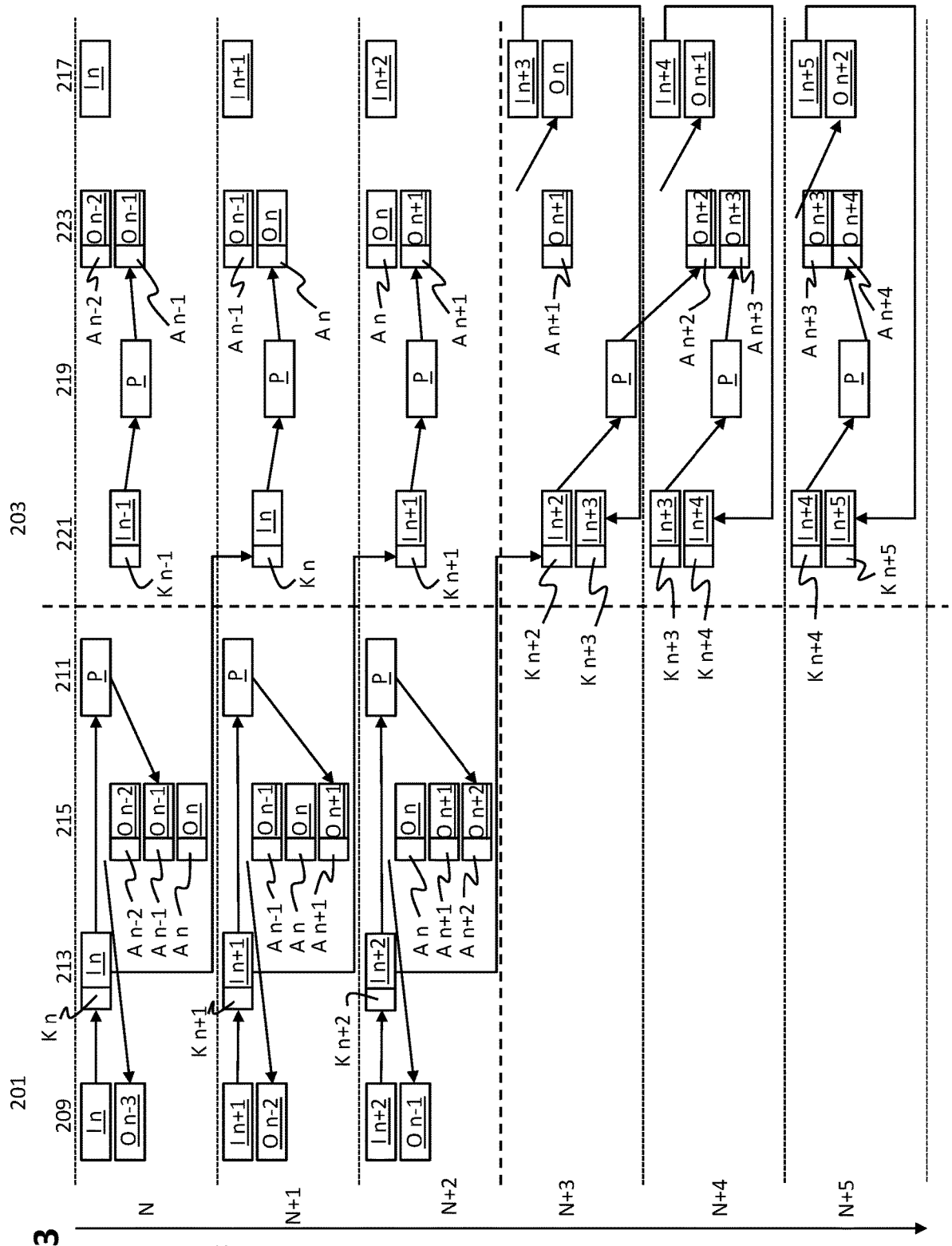
FIG. 3 is a schematic depiction of the chronological sequence of the method of FIG. 2.

The description of the method 100 according to the embodiment in FIG. 2 is made with reference to the description for FIG. 3.

For controlling the automation system 200, in a first controlling step 101 the first controller 201 cyclically controls the automation process of the automation system 200 to be controlled. The cyclic control of the automation process by the first controller 201 here comprises the receiving of corresponding input data 231 and the sending of output data 233 in successive control cycles by the first controller 201.

For any n-th control cycle, wherein n is a natural number≥2, and wherein by the n-th control cycle any control cycle of the cyclic control of the automation process is thus represented, the first controlling step 101 comprises a first input receiving step 103 and a first output transmitting step 105. In the first input receiving step 103, the first input output unit 209 of the first controller 201 receives an n-th set of input data In. The n-th set of input data In comprises input data 231 sent out by the field devices 205 to the first controller 201. In particular, the input data 231 comprise sensor data from sensors of the automation system 200.

In particular, the n-th set of input data In may be embodied as a process image of the inputs and describes the plurality of input data 231 received during the n-th control cycle by the first input-output unit 209 of the first controller 201.

In the first output transmitting step 105, an (n−x)-th set of output data 233 is further sent out to the field devices 205 by the first input-output unit 209 of the first controller 201. Here, the (n−x)-th set of output data describes output data generated by executing the control task in the first processing unit 211 based on an (n−x)-th set of input data. The (n−x)-th set of input data here describes input data 231 received from the first input-output unit 209 of the first controller 201 in an (n−x)-th control cycle. Here, the variable x is a natural number≥1 and describes the dead time, i.e.: the time delay with which output data 233 are transmitted relative to the receipt of corresponding input data 231, on the basis of which the output data 233 was generated. The dead time may in this case comprise a period of several control cycles. The (n−x)-th set of output data sent out in the first output transmitting step 105 is thus based on an (n−x)-th set of input data received in a temporally earlier executed (n−x)-th control cycle by the first input-output unit 209 of the first controller 201.

The cyclic control of the automation process by the first controller 201 thus provides that in any n-th control cycle, current input data in the form of an n-th set of input data In is received and output data in the form of an (n−x)-th set of output data is transmitted to the field devices 205, wherein the (n−x)-th set of output data sent out is based on an (n−x)-th set of input data received in a temporally earlier (n−x)-th control cycle performed by the first input-output unit 209 of the first controller 201. In this case, the (n−x)-th control cycle is executed temporally earlier by x control cycles than the n-th control cycle.

In a first data transmitting step 107, the n-th set of input data In is transmitted from the first controller 201 to the second controller 203. The transmission of the n-th set of input data In may be performed during the n-th control cycle, or may be performed in any control cycle that is timed to occur between the n-th control cycle and an (n+x)-th control cycle. The (n+x)-th control cycle is executed later than the n-th control cycle by the dead time x.

In a first processing step 109, the n-th set of input data In is processed by the second processing unit 219 of the second controller 203, and an n-th set of output data On is generated. The first processing step 109 may again also be performed in the n-th control cycle, or it may be performed in any control cycle that is temporally executed between the n-th control cycle and the (n+x)-th control cycle.

In a first output storing step 111, the n-th set of output data On is stored in the second output memory unit 223 of the second controller 203. Again, the first output storing step 111 may be executed in the n-th control cycle or else in any control cycle executed in time between the n-th control cycle and the (n+x)-th control cycle.

During the first n+x control cycles, the automation process is cyclically controlled by the first controller 201 according to the method steps described above. During this time, the second controller 203 is operated as a redundancy and is brought to the state of the first controller 201 by generating corresponding sets of output data 233, in which both controllers 201, 203 during each control cycle have the sets of output data 233 to be sent out to the field devices 205 in a temporally following control cycle for controlling the automation process.

In an error determining step 113, a malfunction of the first controller 201 is determined during the (n+x)-th control cycle. A malfunction of the first controller 201 may comprise any error of the first controller 201 that prevents reliable cyclic control of the automation process by the first controller 201.

The malfunction of the first controller 201 may e.g. be determined by a control module of the automation system 200 that is configured to monitor a functionality of the first controller 201 or the second controller 203.

After detecting the malfunction of the first controller 201 in the (n+x)-th control cycle, in a further output transmitting step 115, the n-th set of output data On stored in the second output memory unit 223 of the second controller 203 is sent out to the field devices 205 of the automation system 200 by the second input-output unit 217 of the second controller 203. This allows control of the automation process via the second controller 203 to continue in the event of a malfunction of the first controller 201. Since the n-th set of output data On is already stored in the second output memory unit 223 of the second controller 203 at the time the malfunction of the first controller 201 is detected, in the present embodiment during the (n+x)-th control cycle, it may be transmitted to the field devices 205 immediately after the malfunction is detected within the (n+x)-th control cycle by the second controller 203 for controlling the automation process. The control of the automation process may thus be continued seamlessly and an interruption of the automation process, which would be required for generating corresponding output data after the detection of the malfunction may e.g. be avoided.

According to an embodiment of the method 100, it is provided that at each point in time a plurality of sets of output data are stored in the second output memory unit 223. In this way, it may be achieved that at each point in time the second controller 203 has the output data intended for the respective control cycle stored in stock in the second output memory unit 223, so that the required output data may be sent out immediately in the respective control cycle and the automation process may thus be controlled continuously.

FIG. 3 shows a schematic depiction of a time sequence of the method 100 in FIG. 2.

In FIG. 3, a time sequence of the method 100 in the embodiment in FIG. 2 is shown. For this purpose, FIG. 3 shows an exemplary embodiment in which the dead time x is equated with the time span of three successive control cycles. Thus, in FIG. 3, the (n+x)-th control cycle corresponds to the (n+3)-th control cycle shown in FIG. 3.

FIG. 3 shows the first controller 201 and the second controller 203, in particular the first input-output unit 209, the first input memory unit 213, the first output memory unit 215, and the first processing unit 211, such as the second input memory unit 221, the second processing unit 219, the second output memory unit 223, and the second input-output unit 217.

Furthermore, six successive control cycles are shown, arranged one after the other along a time axis t. The actions of the first controller 201 or the second controller 203 represented within a control cycle take place simultaneously, or within the respective control cycle, while the actions represented successively along the time axis t take place successively in time.

In any n-th control cycle, the first controller 201 receives an n-th set of input data In via the first input-output unit 209 and sends out an (n−3)-th set of output data On−3 to the field devices 205 of the automation system 200. The (n−3)-th set of output data On−3 was generated at an earlier point in time based on an (n−3)-th set of input data received in an (n−3)-th control cycle. In the embodiment shown in FIG. 3, the received n-th set of input data In is stored in the first input memory unit 213 and forwarded to the first processing unit 211. The first processing unit 211 executes the control task P and generates an n-th set of output data On, which is stored in the first output memory unit 215.

Alternatively, the generation of the n-th set of output data On may be performed in a later control cycle, e.g. the (n+1)-th control cycle or the (n+2)-th control cycle. In the n-th control cycle, in addition to the n-th set of output data On, the first output memory unit 215 comprises an (n−1)-th set of output data On−1 and an (n−2)-th set of output data On−2, each based on an (n−1)-th set of input data and an (n−2)-th set of input data, respectively, generated by executing the control task P on the respective sets of input data 231, each generated at an (n−1)-th control cycle and an (n−2)-th control cycle, respectively, and each generated by executing the control task P on the respective sets of input data 231 at an (n−2)-th control cycle, respectively, by the first input-output unit 209.

In the embodiment shown in FIG. 3, an (n−1)-th set of input data In−1 is further stored in the second input memory unit 221 of the second controller 203. This is transmitted in the n-th control cycle to the second processing unit 219, which generates a corresponding (n−1)-th set of output data On−1 based on the control task P, which is stored in the second output memory unit 223. In the n-th control cycle, the second output memory unit 223 further comprises an (n−2)-th set of output data On−2 based on an (n−2)-th set of input data respectively generated by executing the control task P by the second processing unit 219 on the (n−2)-th set of input data In−2 received in an (n−2)-th control cycle by the first input-output unit 209 and transmitted to the second controller 203. Furthermore, the second controller 203 receives an n-th set of input data In via the second input-output unit 217, but this set is not further processed in the following. Similarly, the second controller 203 receives an n-th set of communication data Kn via the communication interface of the second controller 203, which, however, will not be further dealt with in the following, either.

Furthermore, in the n-th control cycle, the first controller 201 transmits the n-th set of input data In stored in the first input memory unit 213 to the second controller 203. In the embodiment of FIG. 3, the second controller 203 receives the transmitted n-th set of input data In in the temporally following (n+1)-th control cycle. The delay between sending and receiving the n-th set of input data In is based on the transmission time of the data signals between the first controller 201 and the second controller 203, which may vary and is only shown as an example in FIG. 3.

In addition to the n-th set of input data In, the first controller 201 receives an n-th set of communication data Kn via a corresponding communication interface in the n-th control cycle, which is stored in the first input memory unit 213 with the n-th set of input data In. Processing in the first processing unit 211 generates a corresponding n-th set of response data An, which is stored in the first output memory unit 215 together with the n-th set of output data On. Similarly, the first output memory unit 215 further comprises an (n−1)-th set of response data An−1 and an (n−2)-th set of response data An−2. Similarly, in the n-th control cycle, the second input memory unit 221 comprises an (n−1)-th set of communication data Kn−1 stored together with the (n−1)-th set of input data In−1. By executing the second processing unit 219, an (n−1)-th set of response data An−1 is generated as a result, which is stored in the second output memory unit 223 with the (n−1)-th set of output data On−1. Similarly, with the (n−2)-th set of output data On−2, an (n−2)-th set of response data An−2 is stored in the second output memory unit 223. Also, in the n-th control cycle, an (n−3)-th set of response data may be sent out by the first controller 201 via the communication interface.

In the subsequent (n+1)-th control cycle, the first controller 201 receives a corresponding (n+1)-th set of input data In+1 via the first input-output unit 209, which, in the embodiment shown in FIG. 3, is stored in the first input memory unit 213, processed in the first processing unit 211 by executing the control task P, and a corresponding (n+1)-th set of output data On+1 is generated, which is stored in the first output memory unit 215. Similarly, an (n+1)-th set of communication data Kn+1 is received via the communication interface, stored in the first input memory unit 213, processed by the first processing unit 211, and a corresponding (n+1)-th set of response data An+1 is generated, stored in the first output memory unit 215.

Furthermore, the (n−2)-th set of output data On−2 stored in the first output memory unit 215 is sent out by the first input-output unit 209 in the (n+1)-th control cycle. Similarly, the (n−2)-th set of response data An−2 is sent out via the communication interface. Furthermore, the second controller 203 receives the n-th set of input data In transmitted in the n-th control cycle via the first controller 201 and stores it in the second input memory unit 221. Furthermore, via execution of the control task P on the n-th set of input data In by the second processing unit 219, an n-th set of output data On is generated and stored in the second output memory unit 223. Similarly, an n-th set of communication data Kn is received and an n-th set of response data An is generated and stored in the second output memory unit 223. Furthermore, the second controller 203 receives an (n+1)-th set of input data In+1 via the second input-output unit 217, but the set of input data In+1 is not further processed in the shown embodiment. Similarly, the second controller 203 receives an (n+1)-th set of communication data Kn+1 via the communication interface of the second controller 203, but this is not dealt with in the following, either.

In the subsequent (n+2)-th control cycle, the first controller 201 receives an (n+2)-th set of input data In+2, stores it in the first input memory unit 213, and generates a corresponding (n+2)-th set of output data On+2 by executing the control task P on the (n+2)-th set of input data In+2, which is stored in the first output memory unit 215. Similarly, an (n+2)-th set of communication data Kn+2 is received and an (n+2)-th set of response data An+2 is generated and stored. In the (n+2)-th control cycle, the second controller 203 receives the (n+1)-th set of input data In+1 transmitted from the first controller 201 in the (n+1)-th control cycle and stores it in the second input memory unit 221. Analogously to the above, an (n+1)-th set of output data On+1 is generated and stored from the (n+1)-th set of input data In+1 by execution of the control task P. Similarly, an (n+1)-th set of communication data Kn+1 is received, and a corresponding (n+1)-th set of response data An+1 is generated and stored in the second output memory unit 223. Furthermore, the second controller 203 receives an (n+2)-th set of input data In+2 via the second input-output unit 217, but this set is not further processed in the embodiment shown. Similarly, the second controller 203 receives an (n+2)-th set of communication data Kn+2 via the communication interface of the second controller 203, but this is also not discussed further below.

In the (n+2)-th control cycle, the (n−1)-th set of output data On−1 stored by the first controller 201 in the first output memory unit 215 is further sent out via the first input-output unit 209. Similarly, the (n−1)-th set of response data An−1 is sent out via the communication interface.

In the subsequent (n+3)-th control cycle, a malfunction of the first controller 201 is detected, which has the effected that cyclic control of the automation process via the first controller 201 is no longer possible. Thereupon, the n-th set of output data On stored in the second output memory unit 223 at the time of the (n+3)-th control cycle is sent out by the second controller 203 to the field devices 205 of the automation system 200 for controlling the automation process via the second input-output unit 217. As a result, the second controller 203 ensures that in the (n+3)-th control cycle in which control by the first controller 201 is no longer possible, the n-th set of output data On provided for this control cycle is sent out to the field devices 205 of the automation system 200. Thus, in case of a malfunction of the first controller 201, an undelayed control of the automation process by the second controller 203 may be ensured.

Furthermore, in the (n+3)-th control cycle, the second controller 203 receives the (n+2)-th set of input data In+2 and the (n+2)-th set of communication data Kn+2 transmitted from the first controller 201 in the (n+2)-th control cycle, stores them in the second input memory unit 221, and generates a corresponding (n+2)-th set of output data On+2 and an (n+2)-th set of response data An+2 by executing the control task P. However, in the embodiment shown in FIG. 3, storing the (n+2)-th set of output data On+2 and the (n+2)-th set of response data An+2 in the second output memory unit 223 is not performed until the subsequent (n+4)-th control cycle. According to an embodiment, processing of the sets of input data stored in the second input memory unit 221 may be performed at any time.

Moreover, in the (n+3)-th control cycle, the second controller 203 receives an (n+3)-th set of input data In+3 via the second input-output unit 217 and an (n+3)-th set of communication data Kn+3 via the communication interface, which the second controller 203 stores in the second input memory unit 221 in the (n+3)-th control cycle.

After malfunction of the first controller 201 in the (n+3)-th control cycle, the second controller 203 takes over cyclic control of the automation process for the subsequent control cycles, so that in the following (n+4)-th control cycle, the second controller 203 receives a corresponding (n+4)-th set of input data In+4 via the second input-output unit 217 and an (n+4)-th set of communication data Kn+4 via the communication interface and stores them in the second input memory unit 221. Furthermore, to control the automation process in the (n+4)-th control cycle, the second controller 203 transmits the (n+1)-th set of output data On+1 stored in the second output memory unit 223 based on the set of input data In+1 received in the (n+1)-th control cycle. For communication, the (n+1)-th set of response data An+1 is sent out via the communication interface. In the embodiment shown in FIG. 3, in the (n+4)-th control cycle, an (n+3)-th set of output data On+3 and an (n+3)-th set of response data An+3 are further generated based on the (n+3)-th set of input data In+3 and the (n+3)-th set of communication data Kn+3 stored in the second input memory unit 221 and stored in the second output memory unit 223.

Similarly, in the subsequent (n+5)-th control cycle, an (n+5)-th set of input data In+5 is again received by the second controller 203 via the second input-output unit 217 and an (n+5)-th set of communication data Kn+5 is received via the communication interface and stored in the second input memory unit 221. Furthermore, the (n+2)-th set of output data On+2 stored in the second output memory unit 223 at the time of the (n+5)-th control cycle is sent out to the field devices 205 for controlling the automation process. Furthermore, the (n+2)-th set of communication data Kn+2 is sent out via the communication interface. Analogously to the (n+4)-th control cycle, in the (n+5)-th control cycle, the (n+4)-th set of input data In+4 and the (n+4)-th set of communication data Kn+4 stored in the second input memory unit 221 are furthermore processed, and a corresponding (n+4)-th set of output data On+4 and an (n+4)-th set of response data An+4 are generated and stored in the second output memory unit 223.

The embodiment shown in FIG. 3, in particular the numerical examples shown there, are merely examples of a possible embodiment of the method 100 and are not intended to limit it. In particular, the dead time x, which in the embodiment shown in FIG. 3 corresponds to the period of three successive control cycles, may extend over any period of time. Furthermore, e.g. a plurality of different control tasks P may be executed in one control cycle, such that a plurality of different sets of output data 233 may be generated in a control cycle. Furthermore, processing of the received sets of input data by the processing units or storing of the generated sets of output data in the output memory units may be performed in each control cycle in which the respective sets of input data 231 were received. Alternatively, said operations may be performed at a later control cycle. Alternatively, the processing of received sets of input data via the processing unit and the storing of the generated sets of output data in the respective output memory units may be performed in a period comprising a plurality of successive control cycles.

The n-th to (n+2)-th sets of input data In, In+1, In+2 recorded by the first input-output unit 209 of the first controller 201 and by the second input-output unit 217 of the second controller 203, respectively, may be compared to one another. This may be used to verify that both controllers are operating on identical input data. Similarly, the n-th to (n+2)-th sets of output data On, On+1, On+2 displayed in the n-th to (n+2)-th control cycles by the first processing unit 211 of the first controller 201 and by the second processing unit 219 of the second controller 203, respectively, may be compared to one another. As a result, errors in the processing of the input data by the first controller 201 or the second controller 203 may be determined. The aforementioned comparisons of the input data and the output data, respectively, may be performed by an external controller.

Figure 4:
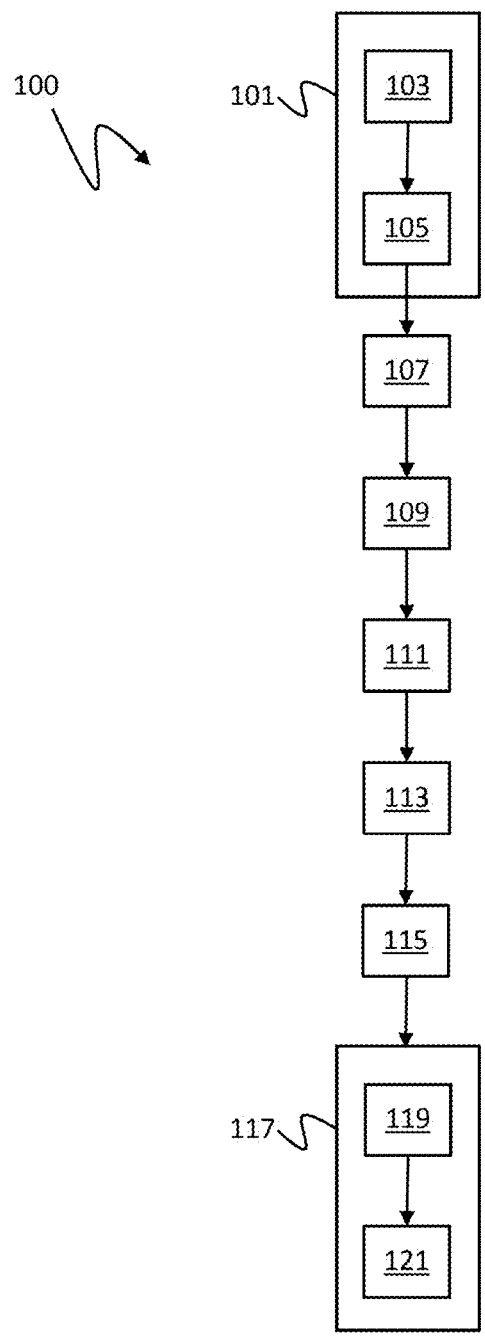
FIG. 4 is a further flowchart of the method for controlling an automation system according to a further embodiment.

FIG. 4 shows a further flowchart of the method 100 for controlling an automation system 200 according to another embodiment.

The embodiment in FIG. 4 is based on the embodiment in FIG. 2 and comprises all the method steps described there. Provided that as these remain unchanged in the embodiment in FIG. 4, a renewed detailed description is dispensed with.

Deviating from the embodiment in FIG. 2, the method 100 in the embodiment of FIG. 4 comprises a second controlling step 117, in which a cyclic control of the automation process is carried out by the second controller 203, comparable to the (n+4)-th control cycle or (n+5)-th control cycle in FIG. 3.

For any (n+m+x)-th control cycle, wherein m is a natural number$\geq 1$, and wherein the (n+m+x)-th control cycle is executed m control cycles later in time than the (n+x)-th control cycle, the second controlling step 117 comprises a second input receiving step 119 and a second output transmitting step 121.

In the second input receiving step 119, the second controller 203 receives an (n+m+x)-th set of input data via the second input-output unit 217.

In the second output transmitting step 121, the second controller 203 sends an (n+m)-th set of output data to the field devices 205 of the automation system 200 via the second input-output unit 217. The (n+m)-th set of output data is in this context based on an (n+m)-th set of input data received in an (n+m)-th control cycle.

Following the numerical example shown in FIG. 3, the arbitrary (n+m+x)-th control cycle e.g. corresponds to the (n+5)-th control cycle for m=2 and x=3. Here, the (n+m)-th set of output data corresponds to the (n+2)-th set of output data On+2, wherein the (n+m+x)-th set of input data corresponds to the (n+5)-th set of input data In+5.

The numerical examples given are again merely exemplary in nature and are not intended to limit the invention.

The second controlling step 117 thus allows for cyclically controlling the automation process by the second controller 203 in the event of a malfunction of the first controller 201.

Figure 5:
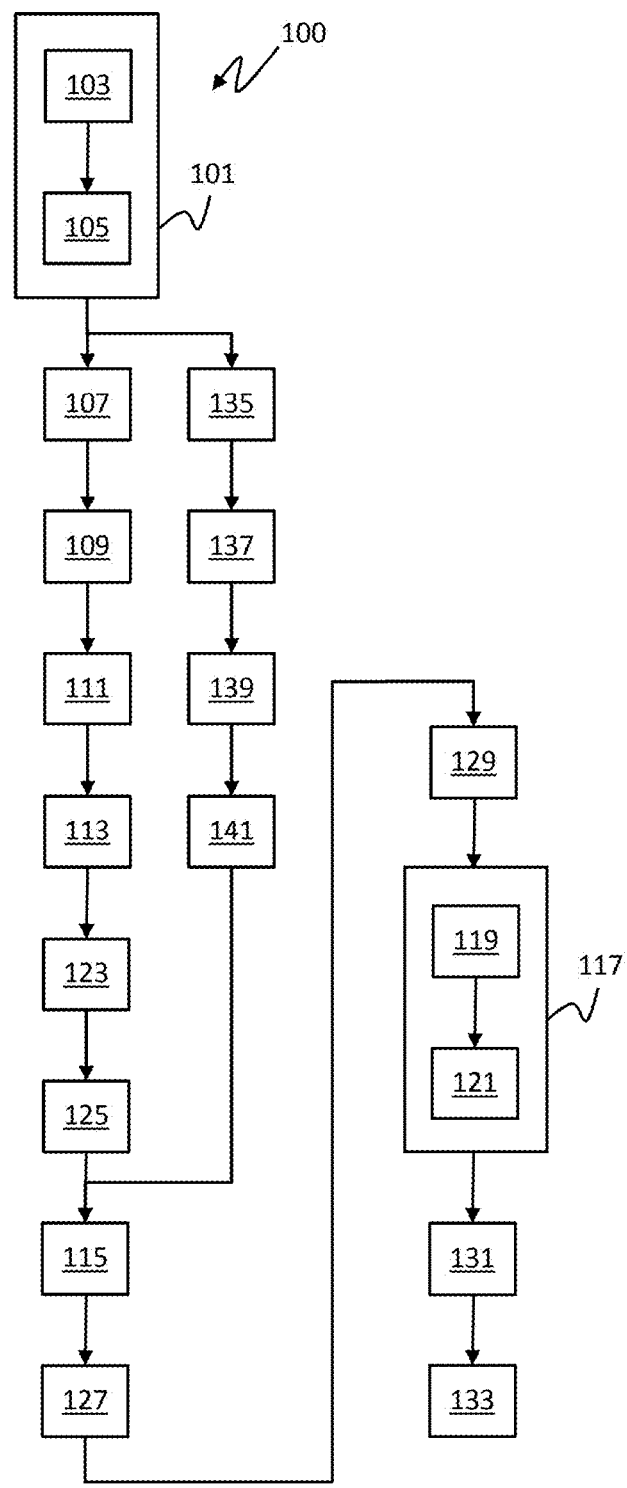
FIG. 5 is a further flowchart of the method for controlling an automation system according to a further embodiment.

FIG. 5 shows a further flowchart of the method 100 for controlling an automation system 200 according to a further embodiment.

The embodiment depicted in FIG. 5 is based on the embodiment shown in FIG. 4 and comprises all the method steps described there. If these remain unchanged in the embodiment in FIG. 5, a detailed description will be dispensed with.

Differing from the embodiment in FIG. 4, the method 100 in the embodiment of FIG. 5 comprises a second processing step 123 and a second output storing step 125. In the second processing step 123, the first processing unit 211 of the first controller 201 processes the n-th set of input data In and generates a corresponding n-th set of output data On. In the second output storing step 125, the generated n-th set of output data On is stored in the first output memory unit 215 of the first controller 201. According to the embodiment shown in FIG. 3, the second processing step 123 and the second output storing step 125 may be carried out in the n-th control cycle. Alternatively, the second processing step 123 and the second output storing step 125 may be executed in any control cycle that is temporally executed between the n-th control cycle and the (n+x)-th control cycle.

Furthermore, in the embodiment shown in FIG. 5, the method 100 comprises a third processing step 127 and a third output storing step 129. In the third processing step 127, the (n+m)-th set of input data is processed and a corresponding (n+m)-th set of output data is generated by the second processing unit 219 of the second controller 203. In the third output storing step 129, the generated (n+m)-th set of output data is stored in the second output memory unit 223 of the second controller 203. According to the embodiment shown in FIG. 3, the third processing step 127 and the third output storing step 129 may be carried out in the (n+m)-th control cycle. Alternatively, the third processing step 127 and the third output storing step 129 may be carried out in any control cycle that is temporally performed between the (n+m)-th control cycle and the (n+m+x)-th control cycle.

The third processing step 127 and the third output storing step 129 may be carried out in the (n+m)-th control cycle. Alternatively, the third processing step 127 and the third output storing step 129 may be executed in analogy to the embodiment in FIG. 3 in any control cycle that is temporally arranged between the (n+m)-th control cycle and the (n+m+x)-th control cycle. For the numerical example of m=1 and x=3 in the embodiment in FIG. 3, the third processing step 127 and the third output storing step 129, i.e., processing the (n+2)-th set of input data In+2 and generating the corresponding (n+2)-th set of output data On+2, are executed in the (n+3)-th control cycle. In contrast, storing the (n+2)-th set of output data On+2 in the second output memory unit 223 is performed in the (n+4)-th control cycle.

Furthermore, in the embodiment shown in FIG. 5, the method 100 comprises a fourth processing step 131 and a fourth output storing step 133. In the fourth processing step 131, the (n+m+x)-th set of input data is processed and a corresponding (n+m+x)-th set of output data is generated by the second processing unit 219 of the second controller 203. In the fourth output storing step 133, the generated (n+m+x)-th set of output data is stored in the second output memory unit 223 of the second controller 203. For example, the fourth processing step 131 and the fourth output storing step 133 may be carried out in the (n+m+x)-th control cycle Similarly, the fourth processing step 131 and the fourth output storing step 133 may be carried out in any control cycle that is temporally executed between the (n+m+x)-th control cycle and an (n+m+2x)-th control cycle.

Furthermore, the embodiment in FIG. 5 comprises a third input receiving step 135 in which an n-th set of input data In is received via the second input-output unit 217 of the second controller 203 in the n-th control cycle.

In a comparing step 137, the n-th set of input data In the first controller 201 is compared to the further n-th set of input data In the second controller 203.

In a deviation determining step 139, a deviation between the n-th set of input data In of the first controller 201 and the further n-th set of input data In of the second controller 203 is determined.

On the basis of the deviation between the two n-th sets of input data of the first controller 201 and of the second controller 203, an error in a data transmission between the field devices 205 and the first controller 201 is determined in a transmission error determining step 141. This corresponds to a malfunction of the first controller 201, so that after the faulty data transmission is determined in the further output transmitting step 115, control of the automation process is taken over by the second controller 203.

In the embodiment shown in FIG. 3, the comparing step 137 is not explicitly depicted. As shown in FIG. 3, both controllers 201, 203 record corresponding sets of input data for each control cycle. A comparison of the respective sets of input data recorded by the first controller 201 and by the second controller 203 may thus be carried out for each control cycle, so that a functionality of the data transmission between the field devices 205 and the first controller 201 and the second controller 203 may be performed in each control cycle.

Figure 6:
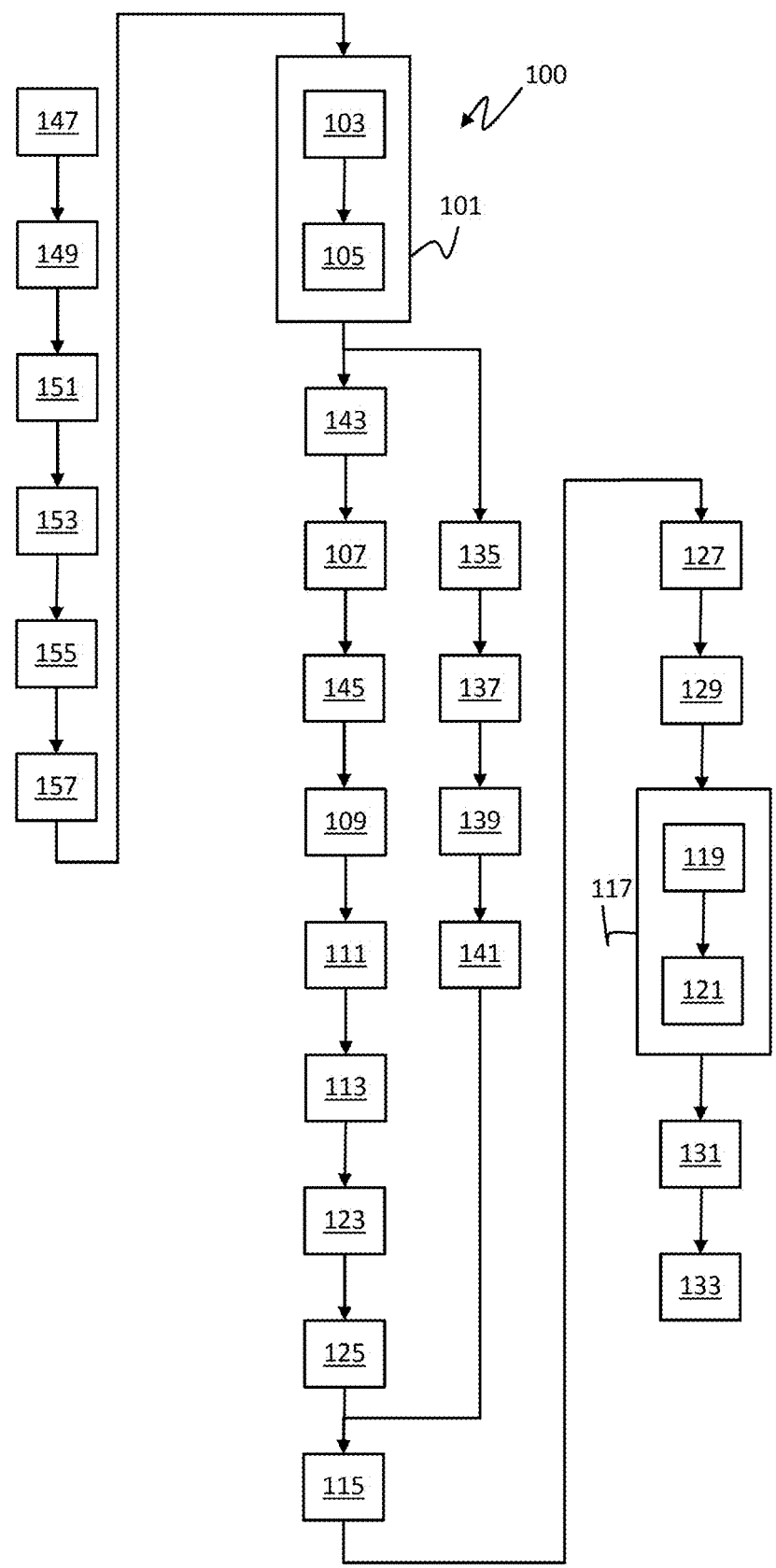
FIG. 6 is a further flowchart of the method for controlling an automation system according to a further embodiment.

FIG. 6 shows another flowchart of the method 100 for controlling an automation system 200 according to another embodiment.

The embodiment of method 100 in FIG. 6 is based on the embodiment of method 100 in FIG. 5 and comprises all the method steps described there. Provided that these remain unchanged in the embodiment in FIG. 6, no further detailed description is provided.

Deviating from the embodiment of FIG. 5, the method 100 in the embodiment in FIG. 6 comprises a memory copying step 147. In the memory copying step 147, a memory copy of the first memory area of the first controller 201 is performed. In this context, the memory copy comprises the sets of input data or output data stored in the first memory area of the first controller 201 temporally before any n-th control cycle in the first input memory unit 213 or the first output memory unit 215.

In a copy transmitting step 149, the memory copy is transmitted to the second controller 203.

In a first copy storing step 151, the sets of input data of the memory copy are stored in the second input memory unit 221 of the second controller 203.

In a second copy storing step 153, the sets of output data of the memory copy are stored in the second output memory unit 223 of the second controller 203.

In a fifth processing step 155, the sets of input data of the memory copy are processed by the second processing unit 219 based on the control task P, and corresponding sets of output data are generated.

In a fifth output storing step 157, the generated sets of output data are stored in the second output memory unit 223 of the second controller 203.

This achieves that, in particular when the system is started up, the second controller 203 is brought to the process state of the first controller 201, so that after the corresponding sets of input data and output data of the memory copy have been stored, the first controller 201 and the second controller 203 may be executed on identical sets of input data and identical sets of output data. This achieves that the first controller 201 and the second controller 203 are interchangeable at any time of the cyclic control of the automation process, and control tasks of one controller may be immediately taken over by the other controller.

In addition to the sets of input data and output data, the memory copy may further comprise all information of a program state of the control program of the automation system. In the program state, all information required for controlling the automation process may be stored. In particular, all variables and program objects of the control program may be stored with corresponding values in the program state. The program state thus describes the state of the automation system at a time when the program state is stored.

The transmission of the memory copy to the second controller 203 as well as the storage of the sets of input data contained in the memory copy in the second input memory unit 221 as well as the storage of the sets of output data contained in the memory copy in the second output memory unit 223 as well as the processing of the sets of input data and the generation of corresponding sets of output data by the second processing unit 219 of the second controller 203 may be performed in one control cycle. Alternatively, depending in particular on the data size of the memory copy, the transfer and storage of the sets of input data in the second input memory unit 221 and the storage of the sets of output data in the second output memory unit 223, respectively, as well as the processing of the sets of input data and the generation of corresponding sets of output data by the second processing unit 219 and the corresponding storage of the generated sets of output data in the second output memory unit 223 may be performed over a period of time comprising a plurality of successive control cycles. In particular, when the memory copy comprises the program state of the control program and thus, depending on the complexity of the particular automation process or automation system to be controlled, the memory copy may have a substantial amount of data.

In this case, the transfer and storage of the data contained in the memory copy by the second controller 203 may take a period of time that comprises a plurality of consecutive control cycles. Upon completion of the transfer and storage of the memory copy in the memory area of the second controller 203 and the reading in of the data of the memory copy by the second controller 203, the second memory unit 203 may generate sets of output data via the second processing unit 219, as described above, and store these, in the second output memory unit 223. The second controller 203 may continue to do so until the second controller 203 is at the same level as the first controller 203, that is, the second controller 203 has generated and stored a set of output data to be sent out in a subsequent control cycle according to the predetermined dead time in the second output memory unit 223.

In the embodiment shown, the method 100 further comprises an input storing step 143 and a second input storing step 145. In the first input storing step 143, the first controller 201 stores the n-th set of input data In received in the n-th control cycle in the first input memory unit 213 n-th control cycle. In the second input storing step 145, the second controller 203 stores the n-th set of input data In transmitted from the first controller 201 to the second controller 203 in the second input memory unit 221 of the second controller 203.

By storing the n-th set of input data In in the first input memory unit 213, it may be achieved that the received input data 231 in the form of the n-th set of input data In does not need to be processed directly in the control cycle by the processing unit by executing the control task P in which the input data 231 is received. Instead, any later processing may e.g. be carried out at a time when computing capacity is advantageous and no other applications are delayed by the processing of the input data 231. The same applies to the storage of the input data in the second input memory unit 221 by the second controller 203. As a result, the second controller 203 for processing the input data is not bound to the respective control cycle in which the input data 231 sent out from the first controller 201 to the second controller 203 is received by the second controller 203, either.

Figure 7:
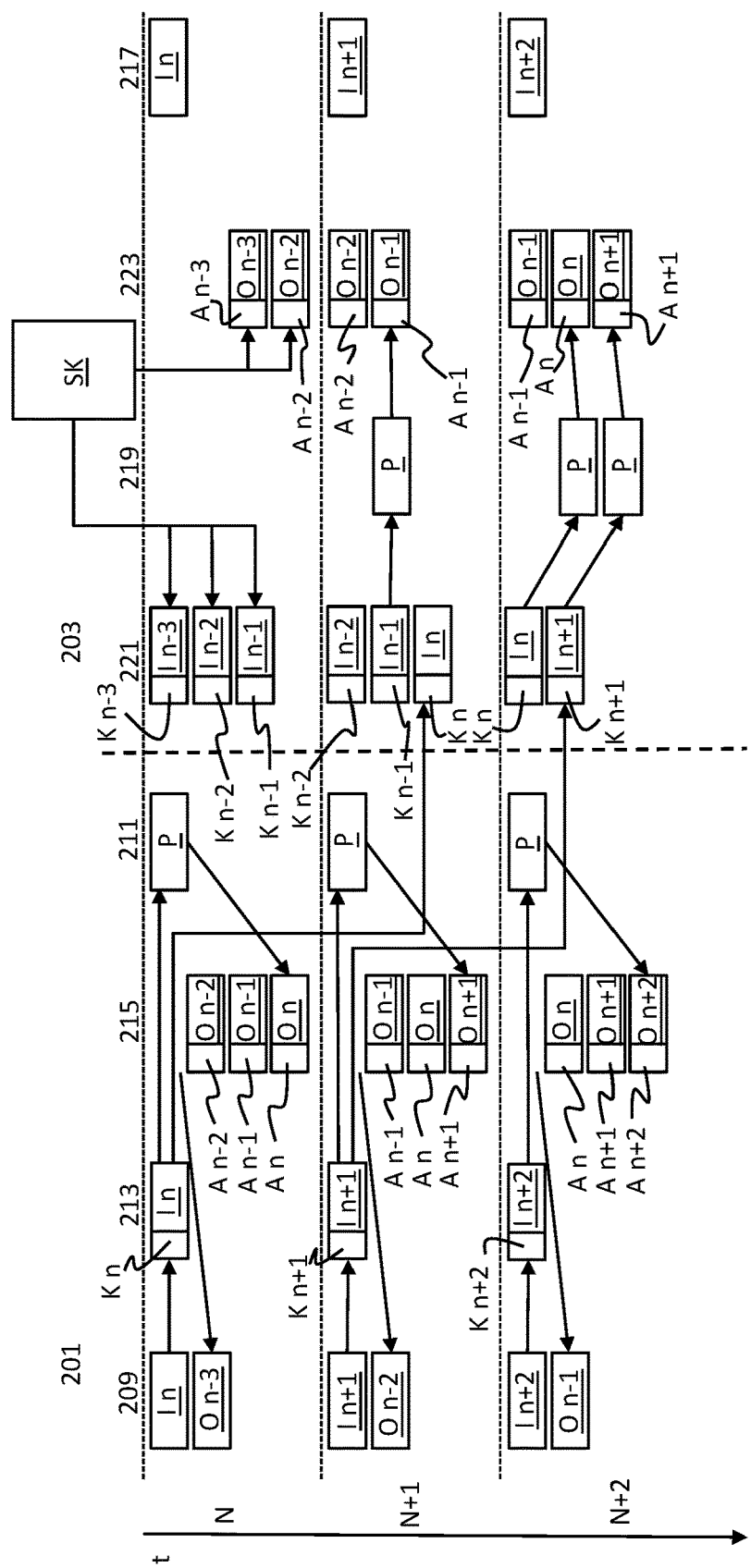
FIG. 7 is a schematic depiction of a chronological sequence of the method of FIG. 6.

FIG. 7 shows a schematic depiction of a time sequence of the method 100 in FIG. 6.

The depiction in FIG. 7 of the time sequence of the method 100 is analogous to the depiction in FIG. 3. The focus of the illustration in FIG. 7 is on the storage of the memory copy SK and the implementation of the information of the memory copy SK by the second controller 203.

FIG. 7 shows the case in which the automation process is cyclically controlled exclusively by the first controller 201. For this purpose, the first controller receives a corresponding set of input data and sends a set of output data to the field devices in each control cycle. The processes of the first controller 201 for controlling the automation process are analogous to the mechanism illustrated in FIG. 3 and will not be described again below.

In any n-th control cycle, the second controller 203 receives the memory copy SK of the program state of the automation system 200 in which the comprehensive information needed to control the automation process, including the states of the individual components, i.e., devices, of the automation system 200 involved in the automation process, and stores the memory copy SK in the memory area of the second controller 203.

Deviating from that shown in FIG. 7, the receiving and storing of the memory copy SK by the second controller 203 may comprise a plurality of successive control cycles.

In the embodiment shown in FIG. 7, the second controller 203 stores, from the memory copy SK, an n−3th set of input data In−3 and communication data Kn−3, an n−2th set of input data In−2 and communication data Kn−2, and an n−1th set of input data In−1 and communication data Kn−1 in the second input memory unit 221 in the n-th control cycle. Moreover, the second controller 203 stores an n−3-th set of output data On−3 and response data An−3 from the memory copy SK, and an n−2-th set of output data On−2 and response data An−2 in the second output memory unit 223. The depicted number of sets of input data and output data stored in the respective memory units from the memory copy SK are merely exemplary in nature and may vary as desired.

In a subsequent n+1th control cycle, the second controller 203 receives from the first controller 201, the n-th set of input data In including the communication data Kn received from the first controller 201 in the n-th control cycle and stores it in the second input memory unit 221. However, the processing of the n-th sets of input data In and communication data Kn by executing the control task P is not executed in the n+1th control cycle but in a later control cycle, in the embodiment shown, in the subsequent n+2th control cycle. This delay in processing is exemplary and is merely intended to illustrate that receiving and processing input data 231 and communication data may be performed at different times and in different control cycles. Furthermore, in the n-th control cycle, the (n−1)-th set of input data In−1 is processed by the second processing unit 219 and a corresponding (n−1)-th set of output data On−1 is generated and stored in the second output memory unit 223. Similarly, the (n−1)-th set of communication data Kn−1 is processed by carrying out the control task P and a corresponding (n−1)-th set of response data An−1 is generated and this is stored in the output memory unit 223.

In an n+2-th control cycle, an n+1-th set of input data In+1 sent out from the first controller 201 including the communication data Kn+1 is received and stored in the second input memory unit 221. Furthermore, the n-th set of input data In and the (n+1)-th set of input data In+1 are processed by the second processing unit 219 including the respective communication data, and accordingly, an n-th set of output data On, an n-th set of response data An, an (n+1)-th set of output data On+1, and an (n+1)-th set of response data An+1 are generated and stored in the second output memory unit 223. As mentioned above, execution of the control task P on corresponding input data by the first processing unit 213 or the second processing unit 219 may be performed at arbitrary times, so that multiple sets of input data may also be processed within one control cycle, if necessary.

In the embodiment shown in FIG. 7, in the n+2nd control cycle, in particular after completion of the n+1th control cycle, the recording of the information of the memory copy SK by the second controller 203 is completed. From the n+2-th control cycle, the second controller 203 exclusively processes input data, received from the first controller 201 in a control cycle carried out immediately previously. Furthermore, in the second output memory unit 223 the current sets of output data are provided, i.e. the sets of output data On, to be sent out in an immediately subsequent control cycle according to the predetermined dead time x. Thus, the second controller 203, after completion of the storage of the memory copy SK at the beginning of the n+2th control cycle, is at the same level as the first controller 201, comprises the sets of output data and response data that would be to be sent out in the immediately following control cycle or cycles, and is thus able to seamlessly take over and continue control of the automation process from the first controller 201.

During the n-th to (n+2)-th control cycles, the second controller 203 further receives n-th to (n+2)-th sets of communication data Kn, Kn+1, Kn+2, but these are not considered further in the course of the control cycles as long as the control of the automation process and the data communication is controlled by the first controller 201.

In FIG. 3 and FIG. 7, the input data sent out by the first controller 201 in one control cycle is received by the second controller 203 in the immediately following control cycle. Due to the time required for data transmission, this may in reality take a longer period of time, so that receipt by the second controller 203 may occur at a later control cycle.

The control tasks P carried out in FIG. 3 and FIG. 7 in the various control cycles for generating output data may be an identical control task P that is executed repeatedly in successive control cycles in the cyclic control of the automation process. For example, the control task P may represent a complete control program of the automation process. Alternatively, the control task P may represent different parts of the control program that are executed in different control cycles. This is not explicitly shown in FIG. 3 and FIG. 7.

The output data generated by the second controller 203 in FIG. 3 and FIG. 7, which is not sent out by the second controller 203 but by the first controller 201 in the control cycles provided for this purpose because there is no malfunction of the first controller 201, is removed from the second input-output unit 217 of the second controller 203 in subsequent control cycles. Output data and also communication data are sent out by the second controller 203, in particular by the second input-output unit 217, only if there is a malfunction of the first controller and the control of the automation process is taken over by the second controller 203.

Figure 8:
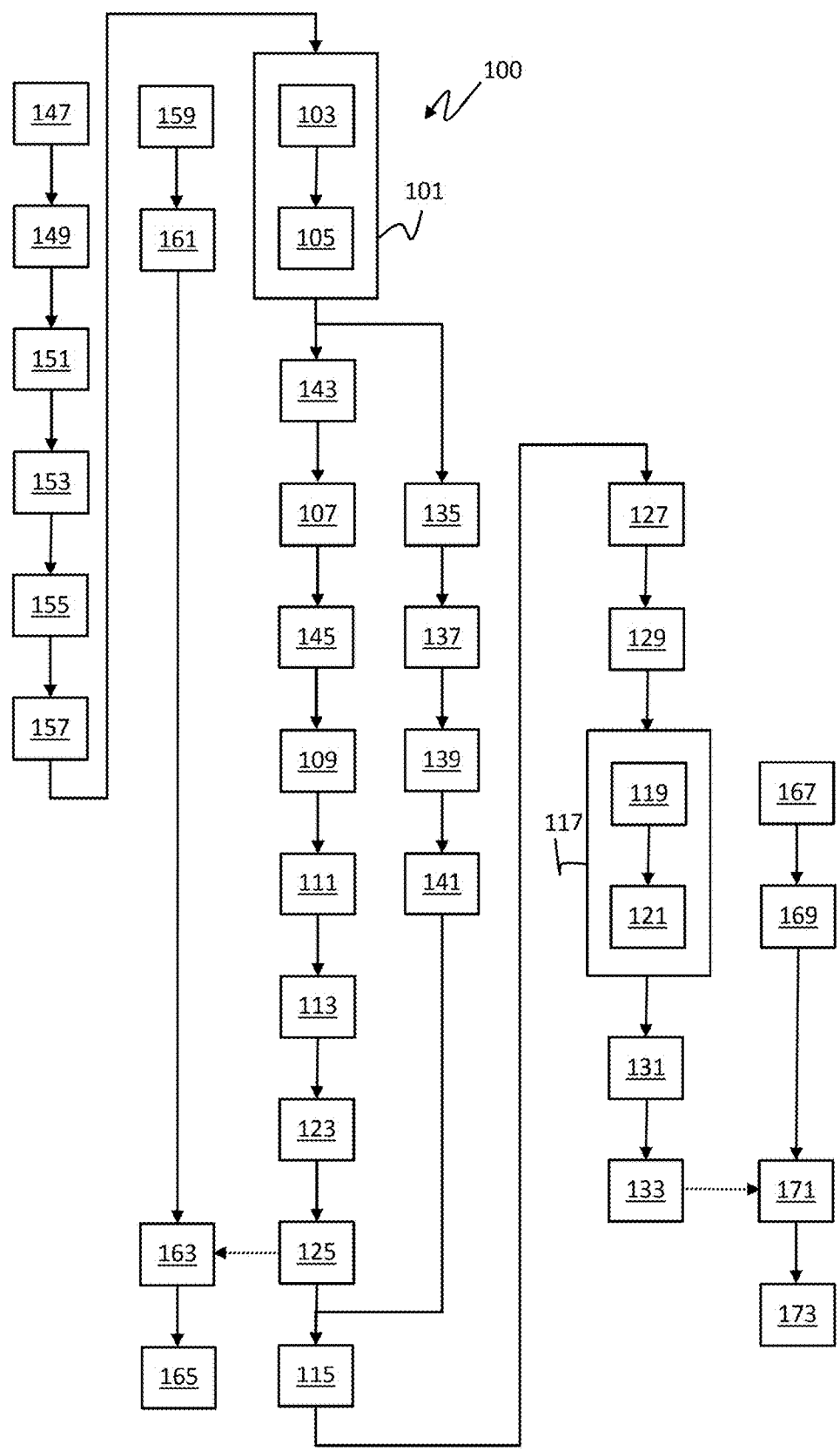
FIG. 8 is a further flowchart of the method for controlling an automation system according to a further embodiment.

FIG. 8 shows another flowchart of the method 100 for controlling an automation system 200 according to a further embodiment.

The embodiment of method 100 in FIG. 8 is based on the embodiment of method 100 in FIG. 6 and comprises all the method steps described there. If these remain unchanged in the embodiment of FIG. 8, no further detailed description is provided.

Differing from the embodiment of FIG. 6, the method 100 in FIG. 8 comprises a first message receiving step 159 in which an n-th set of communication data Kn is received by the first communication unit of the first controller 201 in the n-th control cycle.

In a first response generating step 161, an n-th set of response data An is subsequently determined based on the received n-th set of communication data Kn.

In a first response storing step 163, the n-th set of response data An is stored in the first output memory unit 215 of the controller 201.

In a first response transmitting step 165, the n-th set of response data An stored in the first output memory unit 215 is sent out via the first communication interface of the first controller 201 in the (n+x)-th control cycle.

According to the embodiment shown in FIG. 3, the received n-th set of communication data Kn is stored with the n-th set of input data In in the first input memory unit 213 of the first controller 201. Similarly, the n-th set of response data An is stored with the n-th set of output data On in the first output memory unit 215. In analogy to the embodiment of FIG. 3, the sets of response data may be transmitted from the first controller 201 to the second controller 203 together with the sets of output data for data communication.

Furthermore, a second message receiving step 167 receives (n+m+x)-th communication data via the second communication unit of the second controller 203 in the (n+m+x)-th control cycle.

In a second response generating step 169, (n+m+x)-th response data are generated in response to the received (n+m+x)-th communication data.

In a second response storing step 171, the (n+m+x)-th response data are stored in the second output memory unit 223 of the second controller 203.

In a second response transmitting step 173, the (n+m+x)-th response data are transmitted via the second communication interface of the second controller 203 in an (n+m+2x)-th control cycle. Data communication between modules of the automation system 200, in particular between the first controller 201 and the second controller 203, is enabled by the data transmission of the communication data or the response data.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals

- 100 method
- 101 first controlling step
- 103 first input receiving step
- 105 first output transmitting step
- 107 first data transmitting step
- 109 first processing step
- 111 first output storing step
- 113 error detecting step
- 115 further output transmitting step
- 117 second controlling step
- 119 second input receiving step
- 121 second output transmitting step
- 123 second processing step
- 125 second output storing step
- 127 third processing step
- 129 third output storing step
- 131 fourth processing step
- 133 fourth output storing step
- 135 third input receiving step
- 137 comparing step
- 139 deviation determining step
- 141 transmission-error detecting step
- 143 first input storing step
- 145 second input storing step
- 147 memory copying step
- 149 copy transmitting step
- 151 first copy storing step
- 153 second copy storing step
- 155 fifth processing step
- 157 fifth output storing step
- 159 first message receiving step
- 161 first response generating step
- 163 first response storing step
- 165 first response transmitting step
- 167 second message receiving step
- 169 second response generating step
- 171 second response storing step
- 173 second response transmitting step
- 200 automation system
- 201 first controller
- 203 second controller
- 205 field device
- 207 data bus
- 209 first input/output unit
- 211 first processing unit
- 213 first input memory unit
- 215 first output memory unit
- 217 second input/output unit
- 219 second processing unit
- 221 second input memory unit
- 223 second output memory unit
- 225 internal data interface
- 227 data link TABLE 1-continued List of reference numerals

- 229 first connecting unit
- 230 second connecting unit
- 231 set of input data
- 233 set of output data
- 235 communication data
- 237 response data

TABLE 2

List of reference symbols
P control task

| In n-th set of input data | Kn n-th communication data |
|---|---|
| In + 1 (n + 1)-th set of input data | Kn + 1 (n + 1)-th communication data |
| In + 2 (n + 2)-th set of input data | Kn + 2 (n + 2)-th communication data |
| In + 3 (n + 3)-th set of input data | Kn + 3 (n + 3)-th communication data |
| In + 4 (n + 4)-th set of input data | Kn + 4 (n + 4)-th communication data |
| In + 5 (n + 5)-th set of input data | Kn + 5 (n + 5)-th communication data |
| In − 1 (n − 1)-th set of input data | Kn − 1 (n − 1)-th communication data |
| In − 2 (n − 2)-th set of input data | Kn − 2 (n − 2)-th communication data |
| In − 3 (n − 3)-th set of input data | Kn − 3 (n − 3)-th communication data |
| On n− th set of output data | An n-th response data |
| On + 1 (n + 1)-th set of output data | An + 1 (n + 1)-th response data |
| On + 2 (n + 2)-th set of output data | An + 2 (n + 2)-th response data |
| On + 3 (n + 3)-th set of output data | An + 3 (n + 3)-th response data |
| On + 4 (n + 4)-th set of output data | An + 4 (n + 4)-th response data |
| On − 1 (n − 1)-th set of output data | An − 1 (n − 1)-th response data |
| On − 2 (n − 2)-th set of output data | An − 2 (n − 2)-th response data |
| On − 3 (n − 3)-th set of output data | An − 3 (n − 3)-th response data |

The invention claimed is:

1. A method for controlling an automation system having control redundancy, wherein the automation system comprises at least a first controller, a second controller, and a plurality of field devices connected to the first controller and the second controller via a data bus, wherein the first controller and the second controller are configured to cyclically control an automation process of the automation system,
    wherein the first controller comprises:
        a first input-output unit for receiving input data from the field devices and sending out output data to the field devices,
        a first processing unit for executing at least one control task and for analyzing the received input data and for generating output data according to the control task, and
        a first output memory unit for storing the generated output data;
    wherein the second controller comprises:
        a second input-output unit for receiving input data from the field devices and sending out output data to the field devices,
        a second processing unit for executing the at least one control task and for analyzing the received input data and for generating output data according to the control task, and
        a second output memory unit for storing the generated output data; and
    wherein the method comprises:
    cyclically controlling the automation process of the automation system via the first controller in a first controlling step, wherein the first controlling step is executed in an n-th control cycle, wherein the n-th control cycle is executed temporally after executing n−1 control cycles, wherein n is a natural number≥2, and wherein the first controlling step comprises:

receiving an n-th set of input data via the first input-output unit of the first controller in a first input receiving step; and sending out an (n−x)-th set of output data via the first input-output unit of the first controller to the field devices in a first output transmitting step, wherein x is a natural number≥1, wherein the transmitted (n−x)-th set of output data is generated based on an (n−x)-th set of input data received in an (n−x)-th control cycle according to the control task, and wherein the (n−x)-th control cycle is executed ahead in time of the n-th control cycle by x control cycles;

transmitting the n-th set of input data from the first controller to the second controller in a first data transmitting step;

processing the n-th set of input data and generating an n-th set of output data via the second processing unit of the second controller in a first processing step;

storing the n-th set of output data in the second output memory unit of the second controller in a first output storing step;

determining a malfunction of the first controller during an (n+x)-th control cycle in a malfunction determining step, wherein the (n+x)-th control cycle is executed later in time by x control cycles than the n-th control cycle; and sending out the n-th set of output data via the second input-output unit of the second controller to the plurality of field devices in the (n+x)-th control cycle for controlling the automation process in a further output transmitting step.

2. The method according to claim 1, further comprising:
cyclically controlling the automation process of the automation system via the second controller in a second controlling step;

wherein the second controlling step is executed in an (n+m+x)-th control cycle, wherein m is a natural number≥1, wherein the (n+m+x)-th control cycle is executed m control cycles later in time than the (n+x)-th control cycle, and wherein the second controlling step comprises:

receiving an (n+m+x)-th set of input data via the second input-output unit of the second controller in a second input receiving step; and sending out an (n+m)-th set of output data via the second input-output unit of the second controller to the field devices in a second output transmitting step, wherein the transmitted (n+m)-th set of output data is generated based on an (n+m)-th set of input data received in an (n+m)-th control cycle according to the control task, and wherein the (n+m)-th control cycle is performed x control cycles ahead in time of the (n+m+x)-th control cycle.

3. The method according to claim 2,
wherein a plurality of sets of output data are stored in the second output memory unit of the second controller during the (n+m+x)-th control cycle, wherein the stored sets of output data are in each case generated according to the control task on the basis of a set of input data received in a control cycle, and wherein the respective control cycles are executed in time between the (n+m)-th control cycle and the (n+m+x)-th control cycle, and wherein the respective sets of output data are sent out to the field devices from the second input-output unit of the second controller in respective control cycles executed in time between the (n+m+x)-th control cycle and an (n+m+2x)-th control cycle.

4. The method according to claim 1,
wherein the first controller further comprises a first output memory unit for storing output data, wherein in the n-th control cycle the (n−x)-th set of output data is stored in the first output memory unit, and wherein the (n−x)-th set of output data is generated in the (n−x)-th control cycle or in any control cycle temporally interposed between the (n−x)-th control cycle and the n-th control cycle.

5. The method according to claim 1, further comprising:
processing the n-th set of input data and generating an n-th set of output data via the first processing unit of the first controller in a second processing step;

storing the n-th set of output data in the first output memory unit of the first controller in a second output storing step, wherein generating the n-th set of output data via the first processing unit of the first controller, storing the n-th set of output data in the second output memory unit via the second controller, and transmitting the n-th set of input data from the first controller to the second controller is carried out in the n-th control cycle or in arbitrary control cycles arranged in time between the n-th control cycle and the (n+x)-th control cycle;

processing the (n+m)-th set of input data and generating an (n+m)-th set of output data via the second processing unit of the second controller in a third processing step;

storing the (n+m)-th set of output data in the second output memory unit of the second controller in a third output storing step, wherein generating the (n+m)-th set of output data via the second processing unit of the second controller and storing the (n+m)-th set of output data in the second output memory unit of the second controller is carried out in the (n+m)-th control cycle or in any control cycle temporally arranged between the (n+m)-th control cycle and the (n+m+x)-th control cycle;

processing the (n+m+x)-th set of input data and generating an (n+m+x)-th set of output data via the second processing unit of the second controller in a fourth processing step; and storing the (n+m+x)-th set of output data in the second output memory unit of the second controller in a fourth output storing step, wherein generating the (n+m+x)-th set of output data via the second processing unit of the second controller and storing the (n+m+x)-th set of output data in the second output memory unit of the second controller is carried out in the (n+m+x)-th control cycle or in any control cycle which is temporally arranged between the (n+m+x)-th control cycle and an (n+m+2x)-th control cycle.

6. The method according to claim 1, further comprising:
receiving a further n-th set of input data via the second input-output unit of the second controller in the n-th control cycle in a third input receiving step;

comparing the n-th set of input data of the first controller with the further n-th set of input data of the second controller in a comparing step;

determining a deviation between the n-th set of input data of the first controller and the further n-th set of input data of the second controller in a deviation determining step; and determining an error in a data transmission between the field devices and the first controller in a transmission error determining step.

7. The method according to claim 1,
wherein a plurality of sets of output data are stored in the first output memory unit of the first controller and/or in the second output memory unit of the second controller during the n-th control cycle,
wherein the stored sets of output data are in each case generated based on a set of input data received in a control cycle according to the control task, and wherein the respective control cycles are executed in time between the (n–x)-th control cycle and the n-th control cycle, and
wherein the respective sets of output data are sent out to the field devices from the first input-output unit of the first controller in respective control cycles executed in time between the n-th control cycle and the (n+x)-th control cycle.

8. The method according to claim 1,
wherein the first controller comprises a first input memory unit for storing input data,
wherein the second controller comprises a second input memory unit for storing input data; and wherein the method further comprises:
storing the n-th set of input data in the first input memory unit of the first controller in the n-th control cycle in a first input storing step; and/or
storing the n-th set of input data transmitted from the first controller to the second controller in the second input memory unit of the second controller in the n-th control cycle in a second input storing step.

9. The method according to claim 8,
wherein the first controller comprises a first memory area for storing first control data of the first controller,
wherein the second controller comprises a second memory area for storing second control data of the second controller,
wherein the first memory area comprises the first input memory unit and the first output memory unit, and
wherein the second memory area comprises the second input memory unit and the second output memory unit; and further comprising:
generating a memory copy in a memory copying step, wherein the memory copy is a copy of the first memory area of the first controller and comprises the sets of input data stored in the first input memory unit and the sets of output data stored in the first output memory unit, wherein the memory copy is generated in any control cycle performed temporally before the n-th control cycle and comprises at least one set of input data stored in the first input memory unit at the time of the respective control cycle and/or at least one set of output data stored in the first output memory unit at the time of the respective control cycle;
transmitting the memory copy to the second controller in a copy transmitting step;
storing the at least one set of input data of the memory copy in the second input memory unit of the second controller in a first copy storing step; and/or
storing the at least one set of output data of the memory copy in the second output memory unit of the second controller in a second copy storing step;
processing the at least one set of input data of the memory copy and generating a corresponding set of output data via the second processing unit of the second controller in a fifth processing step; and
storing the generated set of output data in the second output memory unit of the second controller in a fifth output storing step.

10. The method according to claim 1,
wherein the first controller comprises a first communication interface for receiving and transmitting communication data,
wherein the second controller comprises a second communication interface for receiving and transmitting communication data; and further comprising:
receiving n-th communication data via the first communication unit of the first controller in the n-th control cycle in a first message receiving step;
determining n-th response data upon the received n-th communication data in a first response generating step;
storing the n-th response data in the first output memory unit of the first controller in a first response storing step, wherein the n-th response data are stored in the first output memory unit with the n-th set of output data;
sending out the n-th response data via the first communication interface of the first controller in the (n+x)-th control cycle in a first response transmitting step; and/or
receiving (n+m+x)-th communication data via the second communication unit of the second controller in the (n+m+x)-th control cycle in a second message receiving step;
determining (n+m+x)-th response data to the received (n+m+x)-th communication data in a second response generating step;
storing the (n+m+x)-th response data in the second output memory unit of the second controller in a second response storing step, wherein the (n+m+x)-th communication data are stored in the second output memory unit with the (n+m+x)-th set of output data; and
sending out the (n+m+x)-th response data via the second communication interface of the second controller in the (n+m+2x)-th control cycle in a second response transmitting step.

11. The method according to claim 1,
wherein the first controller comprises a further first processing unit for executing at least one further control task and for analyzing the received input data and for generating further output data according to the further control task,
wherein the second controller comprises a further second processing unit for executing the at least one further control task and for analyzing the received input data and for generating further output data according to the further control task, and
wherein the control task is executable by the first processing unit and the further control task by the further first processing unit of the first controller and/or the control task is executable by the second processing unit and the further control task by the further second processing unit of the second controller simultaneously.

12. The method according to claim 1, wherein the first input memory unit and the first output memory unit of the first controller and the second input memory unit and the second output memory unit of the second controller are configured as first-in-first-out memories.

13. An automation system configured to execute the method according to claim 1, comprising:
at least a first controller and a second controller and a plurality of field devices connected to the first controller and the second controller via a data bus;

wherein the first controller and the second controller are configured to cyclically control an automation process of the automation system;

wherein the first controller comprises:
- a first input-output unit for receiving input data from the field devices and sending output data to the field devices,
- a first processing unit for executing at least one control task and for analyzing the received input data and for generating output data according to the control task,
- a first input memory unit for storing the received input data, and
- a first output memory unit for storing the generated output data; and wherein the second controller comprises:
- a second input-output unit for receiving input data of the field devices and sending output data to the field devices,
- a second processing unit for executing the at least one control task and for analyzing the received input data and for generating output data according to the control task,
- a second input memory unit for storing input data, and
- a second output memory unit for storing the generated output data.

14. The automation system according to claim 13, wherein the first controller comprises a first memory area for storing first control data of the first controller, wherein the second controller comprises a second memory area for storing second control data of the second controller, wherein the first memory area comprises the first input memory unit and the first output memory unit, and wherein the second memory area comprises the second input memory unit and the second output memory unit.

15. The automation system according to claim 13, wherein the first controller and the second controller are connected to each other via a data connection and are configured to carry out a data exchange by a data communication.

16. The automation system according to claim 13, further comprising:
- a first connecting unit and a second connecting unit,
- wherein the first connecting unit and the second connecting unit are connected to the field devices and the first controller and the second controller via the data bus, and
- wherein the first connecting unit and the second connecting unit are configured to control a data flow of input data from field devices to the first controller and to the second controller and/or a data flow of output data from the first controller and/or from the second controller to the field devices.

17. The automation system according to claim 13, wherein the first controller comprises a further first processing unit for executing at least one further control task and for analyzing the received input data and for generating further output data according to the further control task, wherein the second controller comprises a further second processing unit for executing the at least one further control task and for analyzing the received input data and for generating output data according to the further control task, and wherein the control task is executable by the first processing unit and the further control task by the further first processing unit of the first controller and/or the control task is executable by the second processing unit and the further control task by the further second processing unit of the second controller simultaneously.

* * * * *